US012328397B2

(12) United States Patent
Mukai et al.

(10) Patent No.: US 12,328,397 B2
(45) Date of Patent: Jun. 10, 2025

(54) MEMORY PROCESSING APPARATUS, MEMORY VERIFICATION APPARATUS, MEMORY UPDATING APPARATUS, MEMORY PROTECTION SYSTEM, METHOD, AND COMPUTER READABLE MEDIUM

(71) Applicant: NEC Corporation, Tokyo (JP)

(72) Inventors: Akiko Mukai, Tokyo (JP); Kazuhiko Minematsu, Tokyo (JP); Naofumi Homma, Miyagi (JP); Rei Ueno, Miyagi (JP)

(73) Assignee: NEC CORPORATION, Tokyo (JP)

(*) Notice: Subject to any disclaimer, the term of this patent is extended or adjusted under 35 U.S.C. 154(b) by 292 days.

(21) Appl. No.: 17/918,597

(22) PCT Filed: Apr. 23, 2020

(86) PCT No.: PCT/JP2020/017420
§ 371 (c)(1),
(2) Date: Oct. 13, 2022

(87) PCT Pub. No.: WO2021/214922
PCT Pub. Date: Oct. 28, 2021

(65) Prior Publication Data
US 2023/0132163 A1     Apr. 27, 2023

(51) Int. Cl.
*H04L 9/32*   (2006.01)
*H04L 9/06*   (2006.01)
*H04L 9/08*   (2006.01)

(52) U.S. Cl.
CPC .......... *H04L 9/3242* (2013.01); *H04L 9/0618* (2013.01); *H04L 9/0836* (2013.01)

(58) Field of Classification Search
CPC .... H04L 9/3242; H04L 9/0618; H04L 9/0836
See application file for complete search history.

(56) References Cited

U.S. PATENT DOCUMENTS 4,309,569 A    1/1982   Merkle
7,451,310 B2   11/2008  Hall et al.
(Continued)

FOREIGN PATENT DOCUMENTS

| JP | 2014-523020 A | 9/2014 |
| JP | 2016-021224 A | 2/2016 |
| WO | 2013/065241 A1 | 5/2013 |

OTHER PUBLICATIONS

International Search Report for PCT Application No. PCT/JP2020/017420, mailed on Aug. 18, 2020,.
(Continued)

*Primary Examiner* — David R Lazaro
*Assistant Examiner* — Xiang Yu

(57) ABSTRACT

A memory address allocation unit allocates, to each of nodes in a tree structure configured for protecting a memory, a memory address unique to the node. A tag generation unit defines, for each of the nodes in the tree structure, a connection of the memory address and a constant as a nonce, and generates a tag by inputting the nonce and a plaintext of which tampering with is to be detected, or the nonce and a plurality of constants of child nodes of each of the nodes into a message authentication code, the message authentication code being a code by which a partially-updatable tag can be output. A node generation unit uses a constant as a local counter, and generates each of the nodes in the tree structure by combining at least a tag and the local counter.

11 Claims, 18 Drawing Sheets

(56) References Cited

U.S. PATENT DOCUMENTS

| | | |
|---|---|---|
| 9,076,019 B2 | 7/2015 | Queron et al. |
| 2004/0107341 A1 | 6/2004 | Hall et al. |
| 2006/0285684 A1* | 12/2006 | Rogaway .............. H04L 9/0637 |
| | | 380/37 |
| 2019/0043600 A1 | 2/2019 | Saileshwar et al. |
| 2021/0311640 A1* | 10/2021 | Elad .................... G06F 16/9027 |

OTHER PUBLICATIONS

Shay Gueron: A Memory Encryption Engine Suitable for General Purpose Processors. IACR Cryptology ePrint Archive 2016: 204 (2016).

Intel SGX Tutorial, "Intel Software Guard Extensions (Intel SGX)". Reference No. 332680-002, Revision No. 1.1, presented at ISCA 2015, Jun. 2015.

* cited by examiner

MEMORY PROCESSING APPARATUS, MEMORY VERIFICATION APPARATUS, MEMORY UPDATING APPARATUS, MEMORY PROTECTION SYSTEM, METHOD, AND COMPUTER READABLE MEDIUM

This application is a National Stage Entry of PCT/JP2020/017420 filed on Apr. 23, 2020, the contents of all of which are incorporated herein by reference, in their entirety.

TECHNICAL FIELD

The present invention relates to a memory processing apparatus, a memory verification apparatus, a memory updating apparatus, a memory protection system, a method, and a computer readable medium.

BACKGROUND ART

Recently, various devices have been connected to networks, and thus memory protection technologies for detecting tampering with data stored in such devices and for keeping the data secret have become important. In connection with such technologies, Patent Literatures 1, 2 and 3 and Non-patent Literatures 1 and 2 disclose, for protecting a memory, a tree structure in which the target memory is allocated to a leaf node.

CITATION LIST

Patent Literature

Patent Literature 1: U.S. Pat. No. 4,309,569
Patent Literature 2: U.S. Pat. No. 7,451,310
Patent Literature 3: U.S. Pat. No. 9,076,019

Non Patent Literature

Non-patent Literature 1: Shay Gueron: A Memory Encryption Engine Suitable for General Purpose Processors. IACR Cryptology ePrint Archive 2016:204 (2016)
Non-patent Literature 2: Intel SGX Tutorial (Reference Number: 332680-002) presented at ISCA 2015

SUMMARY OF INVENTION

Technical Problem

In the above-described technology disclosed in Patent Literature 1, there is a problem that it is impossible to perform processes for hash generation and the like in the tree structure in a parallel manner, so that the processes may not be performed efficiently. Further, this problem can be solved by the technologies disclosed in Patent Literatures 2 and 3, and Non-patent Literatures 1 and 2. However, even though the processes can be performed in a parallel manner, it is still desired that reading from memories and writing thereto be performable at high speeds.

The present disclosure has been made to solve the above-described problem, and an object thereof is to provide a memory processing apparatus, a memory verification apparatus, a memory updating apparatus, a memory protection system, a method, and a computer readable medium capable of reducing an amount of processing required for writing to a memory in a configuration using a tree structure for protecting the memory.

Solution to Problem

A memory processing apparatus according to the present disclosure includes: memory address allocation means for allocating, to each of nodes in a tree structure configured to protect a memory, a memory address unique to the node; tag generation means for defining, for each of the nodes in the tree structure, a connection of the memory address and a constant as a nonce, generating, for each of leaf nodes and a specific node, a tag by inputting the nonce and a plaintext of which tampering with is to be detected, or the nonce and constants of a plurality of child nodes of each of the nodes into a message authentication code, and generating, for each of nodes other than the leaf nodes and the specific node, a tag by inputting the nonce, the nonce of the specific node, and the tag of the specific node into the message authentication code, the message authentication code being a code by which a partially-updatable tag can be output; and node generation means for generating each of the nodes in the tree structure by using the constant as a local counter and combining at least the tag and the local counter.

A memory verification apparatus according to the present disclosure includes: input means for inputting a tree structure configured to protect a memory and a memory address allocated to the tree structure; and tag verification means for verifying whether or not a plaintext to be verified has been tampered with by generating a path from a leaf node containing the plaintext to a root node, defining, for each of nodes in the path, a connection of the memory address unique to the node and a local counter stored in the node as a nonce, and generating a tag used for a verification by inputting the nonce and the plaintext, or the nonce and the local counters of a plurality of child nodes of each of the nodes into a message authentication code, the message authentication code being a code by which a partially-updatable tag can be output.

A memory updating apparatus according to the present disclosure includes: input means for inputting a tree structure configured to protect a memory and a memory address allocated to the tree structure; memory verification means for verifying whether or not a plaintext to be verified has been tampered with by generating a path from a leaf node containing the plaintext to a root node, defining, for each of nodes in the path, a connection of the memory address unique to the node and a local counter stored in the node as a nonce, and generating a tag used for a verification by inputting the nonce and the plaintext, or the nonce and the local counters of a plurality of child nodes of each of the nodes into a message authentication code, and then outputting a result of the verification and the path, the message authentication code being a code by which a partially-updatable tag can be output; counter updating means for, when the result of the verification indicates that no tampering is detected, updating a value of the local counter in each of the nodes in the path; and tag generation means for, when the result of the verification indicates that no tampering is detected, defining a connection of the memory address unique to each of the nodes in the path and the local counter stored in each of the nodes as a nonce, generating a tag used for an update by inputting the nonce and the plaintext, or the nonce, the local counter of at least one child node of each of the nodes, the nonce before the update, and the local counter of at least one child node of each of the nodes before the update into the message authentication code, and updating a value of a tag stored in each of the nodes in the path with the tag used in the update, the message authentication code being the code by which the partially-updatable tag can be output.

A memory protection system according to the present disclosure includes: memory address allocation means for allocating, to each of nodes in a tree structure configured to protect a memory, a memory address unique to the node; tag generation means for defining, for each of the nodes in the tree structure, a connection of the memory address and a constant as a nonce, generating, for each of leaf nodes and a specific node, a tag by inputting the nonce and a plaintext of which tampering with is to be detected, or the nonce and constants of a plurality of child nodes of each of the nodes into a message authentication code, and generating, for each of nodes other than the leaf nodes and the specific node, a tag by inputting the nonce, the nonce of the specific node, and the tag of the specific node into the message authentication code, the message authentication code being a code by which a partially-updatable tag can be output; node generation means for generating each of the nodes in the tree structure by using the constant as a local counter and combining at least the tag and the local counter; and tag verification means for verifying whether or not a plaintext to be verified has been tampered with by generating a path from a leaf node containing the plaintext to a root node, defining, for each of nodes in the path, a connection of the memory address unique to the node and a local counter stored in the node as a nonce, and generating a tag used for a verification by inputting the nonce and the plaintext, or the nonce and the local counters of a plurality of child nodes of each of the nodes into a message authentication code, the message authentication code being a code by which a partially-updatable tag can be output.

A memory processing method according to the present disclosure includes: allocating, to each of nodes in a tree structure configured to protect a memory, a memory address unique to the node; defining, for each of the nodes in the tree structure, a connection of the memory address and a constant as a nonce, generating, for each of leaf nodes and a specific node, a tag by inputting the nonce and a plaintext of which tampering with is to be detected, or the nonce and constants of a plurality of child nodes of each of the nodes into a message authentication code, and generating, for each of nodes other than the leaf nodes and the specific node, a tag by inputting the nonce, the nonce of the specific node, and the tag of the specific node into the message authentication code, the message authentication code being a code by which a partially-updatable tag can be output; and generating each of the nodes in the tree structure by using the constant as a local counter and combining at least the tag and the local counter.

A memory verification method according to the present disclosure includes: inputting a tree structure configured to protect a memory and a memory address allocated to the tree structure; and verifying whether or not a plaintext to be verified has been tampered with by generating a path from a leaf node containing the plaintext to a root node, defining, for each of nodes in the path, a connection of the memory address unique to the node and a local counter stored in the node as a nonce, and generating a tag used for a verification by inputting the nonce and the plaintext, or the nonce and the local counters of a plurality of child nodes of each of the nodes into a message authentication code, the message authentication code being a code by which a partially-updatable tag can be output.

A memory updating method according to the present disclosure includes: inputting a tree structure configured to protect a memory and a memory address allocated to the tree structure; verifying whether or not a plaintext to be verified has been tampered with by generating a path from a leaf node containing the plaintext to a root node, defining, for each of nodes in the path, a connection of the memory address unique to the node and a local counter stored in the node as a nonce, and generating a tag used for a verification by inputting the nonce and the plaintext, or the nonce and the local counters of a plurality of child nodes of each of the nodes into a message authentication code, and then outputting a result of the verification and the path, the message authentication code being a code by which a partially-updatable tag can be output; when the result of the verification indicates that no tampering is detected, updating a value of the local counter in each of the nodes in the path; and when the result of the verification indicates that no tampering is detected, defining a connection of the memory address unique to each of the nodes in the path and the local counter stored in each of the nodes as a nonce, generating a tag used for an update by inputting the nonce and the plaintext, or the nonce, the local counter of at least one child node of each of the nodes, the nonce before the update, and the local counter of at least one child node of each of the nodes before the update into the message authentication code, and updating a value of a tag stored in each of the nodes in the path with the tag used in the update, the message authentication code being the code by which the partially-updatable tag can be output.

A program according to the present disclosure causes a computer to perform: a step of allocating, to each of nodes in a tree structure configured to protect a memory, a memory address unique to the node; a step of defining, for each of the nodes in the tree structure, a connection of the memory address and a constant as a nonce, generating, for each of leaf nodes and a specific node, a tag by inputting the nonce and a plaintext of which tampering with is to be detected, or the nonce and constants of a plurality of child nodes of each of the nodes into a message authentication code, and generating, for each of nodes other than the leaf nodes and the specific node, a tag by inputting the nonce, the nonce of the specific node, and the tag of the specific node into the message authentication code, the message authentication code being a code by which a partially-updatable tag can be output; and a step of generating each of the nodes in the tree structure by using the constant as a local counter and combining at least the tag and the local counter.

A program according to the present disclosure causes a computer to perform: a step of inputting a tree structure configured to protect a memory and a memory address allocated to the tree structure; and a step of verifying whether or not a plaintext to be verified has been tampered with by generating a path from a leaf node containing the plaintext to a root node, defining, for each of nodes in the path, a connection of the memory address unique to the node and a local counter stored in the node as a nonce, and generating a tag used for a verification by inputting the nonce and the plaintext, or the nonce and the local counters of a plurality of child nodes of each of the nodes into a message authentication code, the message authentication code being a code by which a partially-updatable tag can be output.

A program according to the present disclosure causes a computer to perform: a step of inputting a tree structure configured to protect a memory and a memory address allocated to the tree structure; a step of verifying whether or not a plaintext to be verified has been tampered with by generating a path from a leaf node containing the plaintext to a root node, defining, for each of nodes in the path, a connection of the memory address unique to the node and a local counter stored in the node as a nonce, and generating a tag used for a verification by inputting the nonce and the plaintext, or the nonce and the local counters of a plurality of child nodes of each of the nodes into a message authentication code, and then outputting a result of the verification and the path, the message authentication code being a code by which a partially-updatable tag can be output; a step of, when the result of the verification indicates that no tampering is detected, updating a value of the local counter in each of the nodes in the path; and a step of, when the result of the verification indicates that no tampering is detected, defining a connection of the memory address unique to each of the nodes in the path and the local counter stored in each of the nodes as a nonce, generating a tag used for an update by inputting the nonce and the plaintext, or the nonce, the local counter of at least one child node of each of the nodes, the nonce before the update, and the local counter of at least one child node of each of the nodes before the update into the message authentication code, and updating a value of a tag stored in each of the nodes in the path with the tag used in the update, the message authentication code being the code by which the partially-updatable tag can be output.

Advantageous Effects of Invention

According to the present disclosure, it is possible to provide a memory processing apparatus, a memory verification apparatus, a memory updating apparatus, a memory protection system, a method, and a computer readable medium capable of reducing an amount of processing required for writing to a memory in a configuration using a tree structure for protecting the memory.

EXAMPLE EMBODIMENT

Figure 1:
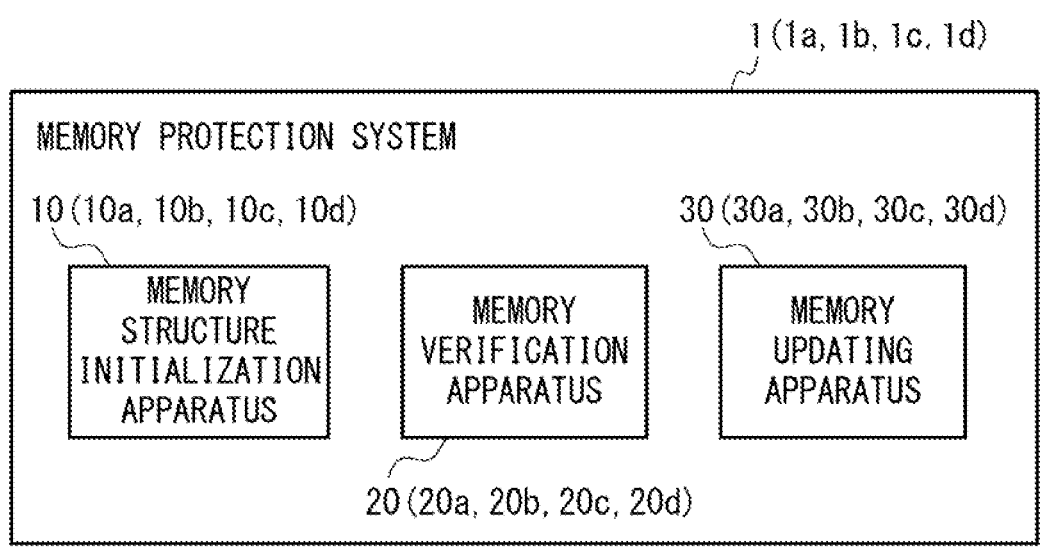
FIG. 1 is a block diagram showing an example of a configuration of a memory protection system.

Outline of Example Embodiment According to Present Disclosure

Prior to describing an example embodiment according to the present disclosure, an outline of the example embodiment according to the present disclosure will be described. Note that although an example embodiment according to the present disclosure will be described hereinafter, the invention is not limited to the below-shown example embodiment. Further, not all the features described in the example embodiment are essential as the means for solving the problem according to the invention.

Recently, various devices such as IoT (Internet of Things) have been connected to networks, and thus there is a possibility that an attack on a device can lead to a large-scale attack because the attack could break into the main frame of the like through a network by using the device as a stepping stone to such a large-scale attack. Therefore, memory protection technologies, such as detection of tampering with data stored in devices and keeping the data secret, are important not only for protecting the devices themselves but also for maintaining the security on the networks connected to the devices.

In addition, the demand for nonvolatile memories has been increasing in recent years, and the possibility that such memories are vulnerable to attacks even when they are powered off has been increasing, so that the memory protection technology has become even more important. Meanwhile, regarding the memory protection technology, the capacities of memories have been increasing in recent years. Therefore, it is desired, when only a small part of large-size data is accessed, to efficiently detect tampering with only the accessed part.

Further, in the memory protection technology, two areas, i.e., On-chip and Off-chip, are defined in a memory. The On-chip is a secure area. Therefore, it is impossible for an attacker to eavesdrop or tamper with data stored in the on-chip. Meanwhile, the Off-chip is an insecure area. Therefore, it is possible for an attacker to eavesdrop and tamper with data stored in the Off-chip. For example, the On-chip is implemented by a memory or the like disposed inside a CPU (Central Processing Unit), and the Off-chip is implemented by a main storage device, an auxiliary storage device, or the like. Note that since the cost for implementing an On-chip is much higher than that for implementing an Off-chip, there is a demand that the detection of tampering with a part of large-size data should be performable by using a smaller On-chip.

As examples of the memory protection technology capable of solving the above problem (i.e., satisfying the above demand), there are technologies disclosed in Patent Literatures 1, 2 and 3 and Non-patent Literatures 1 and 2. As described above, Patent Literatures 1, 2 and 3 and Non-patent Literatures 1 and 2 disclose, for protecting a memory, a tree structure in which the target memory is allocated to a leaf node. Note that as examples of elementary technologies that are used for constructing a tree structure, there are a message authentication code (MAC: Message Authentication Code) and an authenticated encryption (AE: Authenticated Encryption).

The message authentication code (MAC) is a technology in which an authentication tag for detecting tampering with a plaintext message is calculated by using a private key that has been shared in advance between two parties who communicate with each other. By applying the MAC to a communication path, it is possible to detect unauthorized tampering with a plaintext message. In the memory protection technology using a tree structure, by storing a private key in the On-chip, and storing a plaintext message and an authentication tag in the Off-chip, it is possible to detect tampering with the plaintext message.

The authenticated encryption (AE) is a technology in which the encryption of a plaintext message and the calculation of an authentication tag for detecting tampering with the plaintext are performed by using a private key that has been shared in advance between two parties who communicate with each other. By applying the authenticated encryption to a communication path, it becomes possible to keep the contents of a message or the like secret against eavesdropping and to detect unauthorized tampering with a ciphertext. As a result, it is possible to provide strong protection for the contents of the communication. In the memory protection technology using a tree structure, similarly to the MAC, by storing a private key in the On-chip, and storing a plaintext message and an authentication tag in the Off-chip, it is possible to keep the plaintext message secret and detect tampering thereof.

Note that, as described above, in the above-described technology disclosed in Patent Literature 1, there is a problem that it is impossible to perform processes for hash generation and the like in the tree structure in a parallel manner. Further, this problem can be solved by the technologies disclosed in Patent Literatures 2 and 3, and Non-patent Literatures 1 and 2. However, even though the processes can be performed in a parallel manner owing to the aforementioned two patent literatures and two non-patent literatures, it is still desired that reading from memories and writing thereto be performable at high speeds. Further, because of the increase in memory capacity in recent years, the number of branches in the tree structure may increase. Further, as the number of branches increases, the amount of processing required at each node in the tree structure increases. Therefore, it is considered that the amount of processing required for reading from a memory and writing thereto may increase even further even in the tree structures disclosed in Patent Literatures 2 and 3, and Non-patent Literatures 1 and 2 in which the parallel processing is possible. In contrast, in this example embodiment, it is possible to solve the above-described problem and thereby reduce the amount of processing required for writing to a memory as will be described hereinafter.

First Example Embodiment

An example embodiment will be described hereinafter with reference to the drawings. The following description and drawings are partially omitted and simplified as appropriate for clarifying the explanation. Further, the same reference numerals (or symbols) are assigned to the same components/structures throughout the drawings, and redundant descriptions thereof are omitted as appropriate.

In a first example embodiment, an example in which a tree structure constructed in a memory protection system has two branches (i.e., each node has two branches) and a depth d will be described. That is, the number of leaf nodes in the first example embodiment is expressed as $2^d$. Further, the depth of the root node is defined as 0, and the depth of a leaf node is represented by d. In this system, it is assumed that the number of nodes and the amount of data at each node are determined in advance.

FIG. 1 is a block diagram showing an example of a configuration of a memory protection system 1. The memory protection system 1 is, for example, a computer. Note that the memory protection system 1 may implement each of the components shown in FIG. 1 by executing a software program(s) in a central processing apparatus. Further, each of the components implemented in the memory protection system 1 may be implemented as an individual apparatus, a functional unit, or an electronic circuit. This fact also applies to other example embodiments described later.

As shown in FIG. 1, the memory protection system 1 according to the first example embodiment includes a memory structure initialization apparatus 10, a memory verification apparatus 20, and a memory updating apparatus 30. The memory structure initialization apparatus 10, the memory verification apparatus 20, and the memory updating apparatus 30 may be one physically integrated apparatus or may be separate apparatuses. Further, the components of these apparatuses, which will be described below with reference to FIGS. 2 to 4, may be implemented by separate apparatuses. The memory protection system 1 detects tampering with a memory.

Note that the memory protection system 1 may also be referred to as a memory protection system 1*a*, 1*b*, 1*c* or 1*d* when it is mentioned as a reference in other example embodiments (which will be described later). Similarly, the memory structure initialization apparatus 10 may also be referred to as memory structure initialization apparatus 10*a*, 10*b*, 10*c* or 10*d* when it is mentioned as a reference in other example embodiments described later. Similarly, the memory verification apparatus 20 may also be referred to as memory verification apparatus 20*a*, 20*b*, 20*c* or 20*d* when it is mentioned as a reference in other example embodiments described later. Similarly, the memory updating apparatus 30 may also be referred to as memory updating apparatus 30*a*, 30*b*, 30*c* or 30*d* when it is mentioned as a reference in other example embodiments described later. Note that these expressions also apply to components shown in FIGS. 2 to 4.

Figure 2:
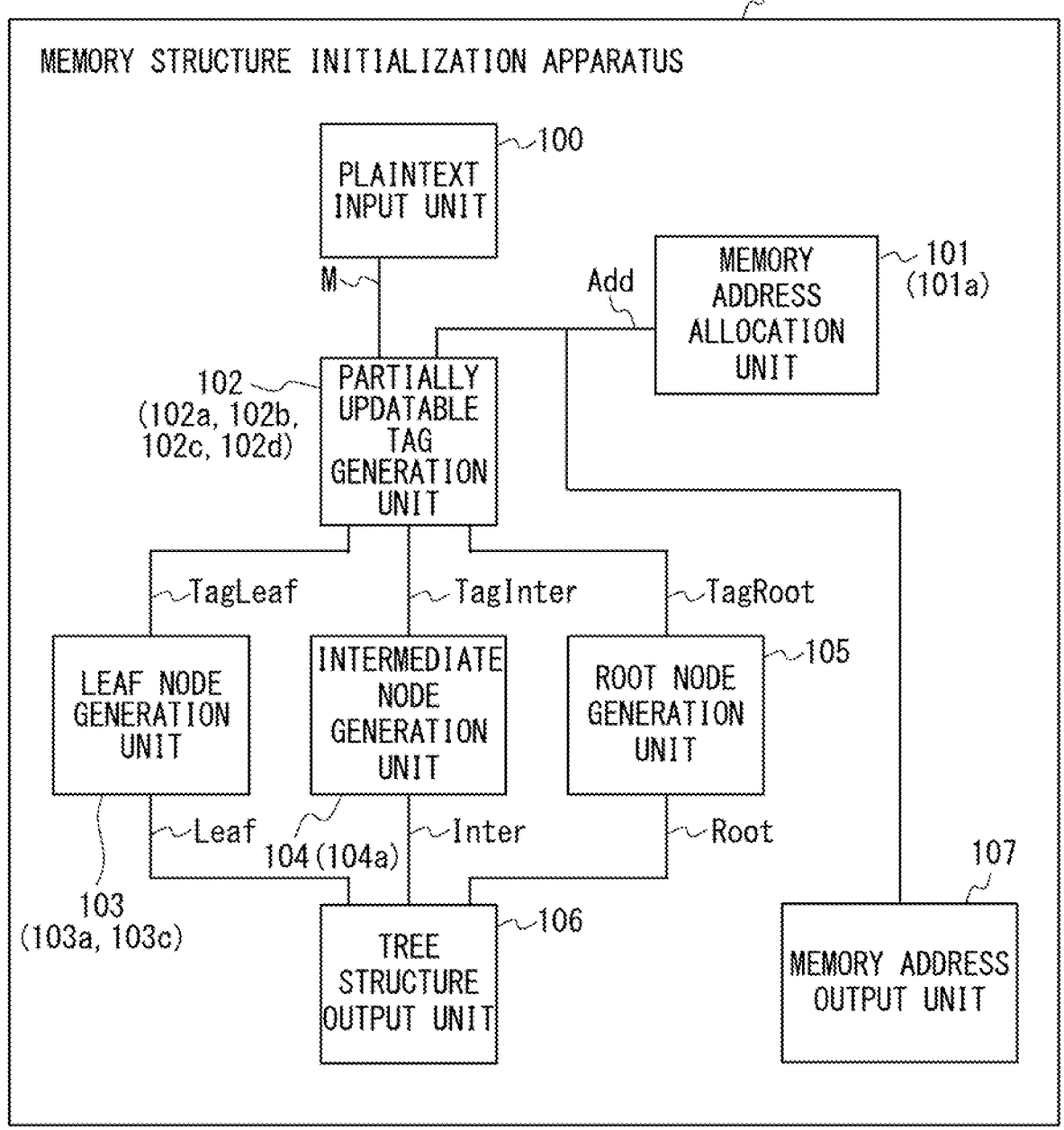
FIG. 2 is a block diagram showing an example of a configuration of a memory structure initialization apparatus.
Figure 3:
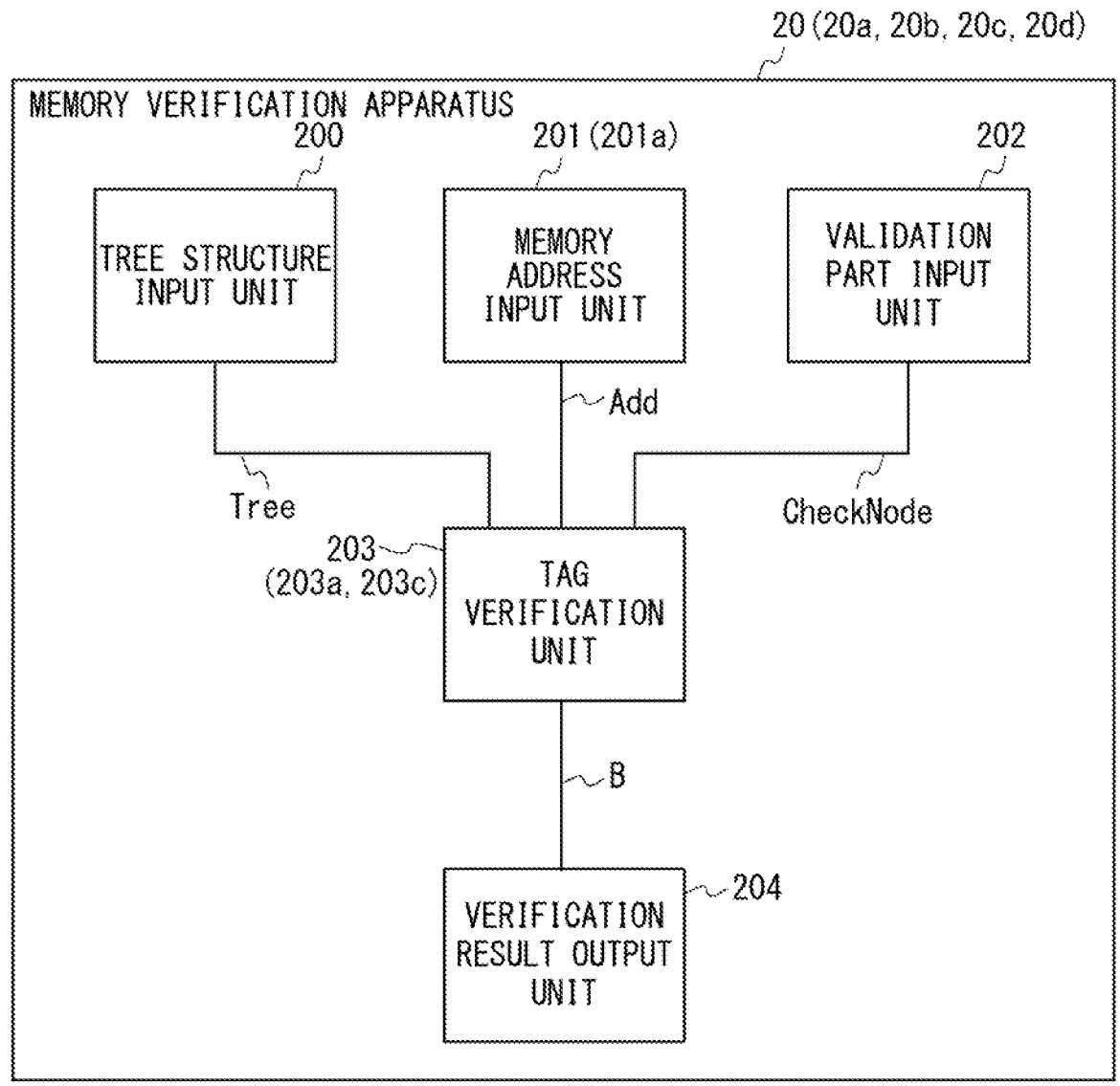
FIG. 3 is a block diagram showing an example of a configuration of a memory verification apparatus.
Figure 4:
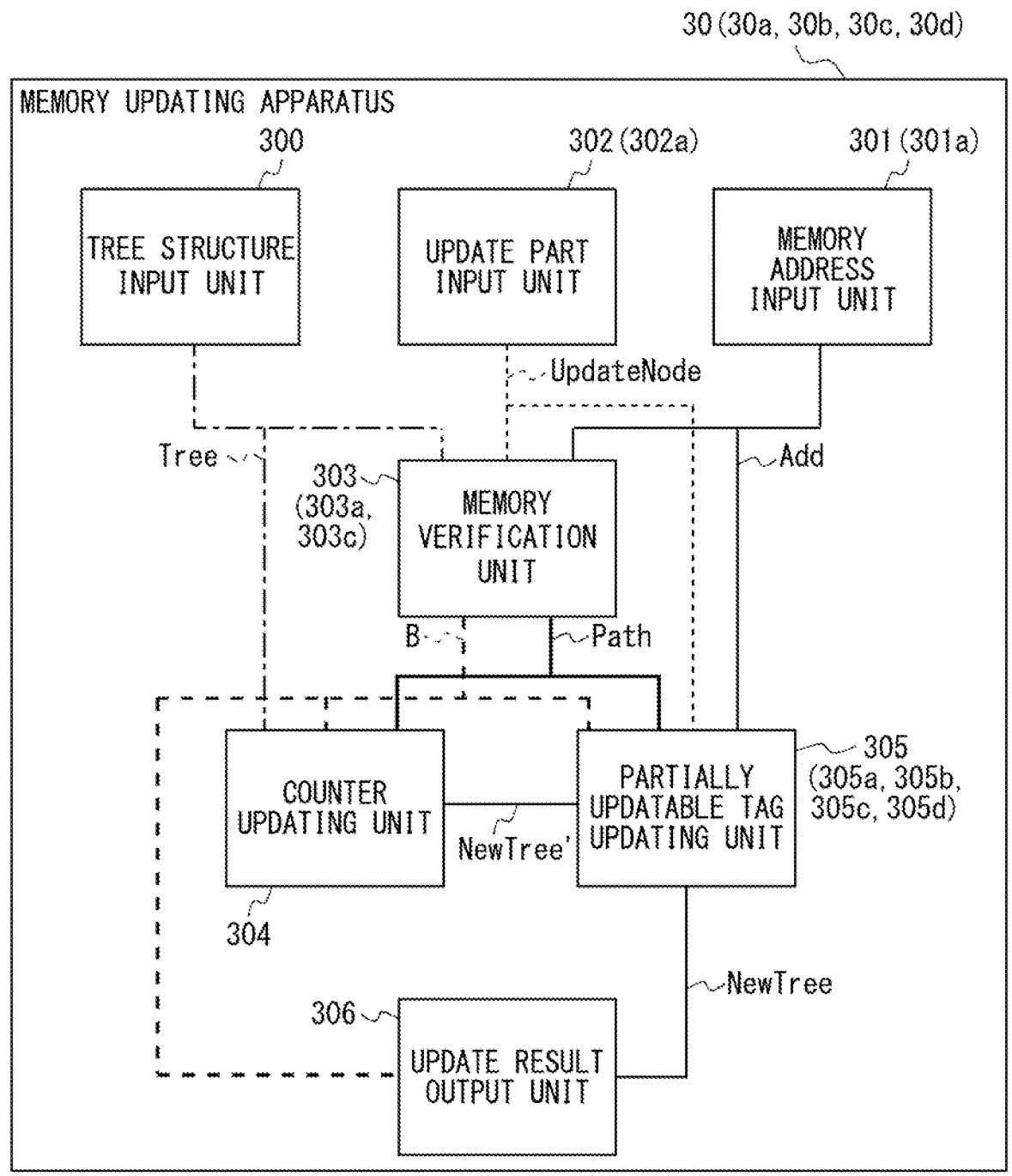
FIG. 4 is a block diagram showing an example of a configuration of a memory updating apparatus.
Figure 5:
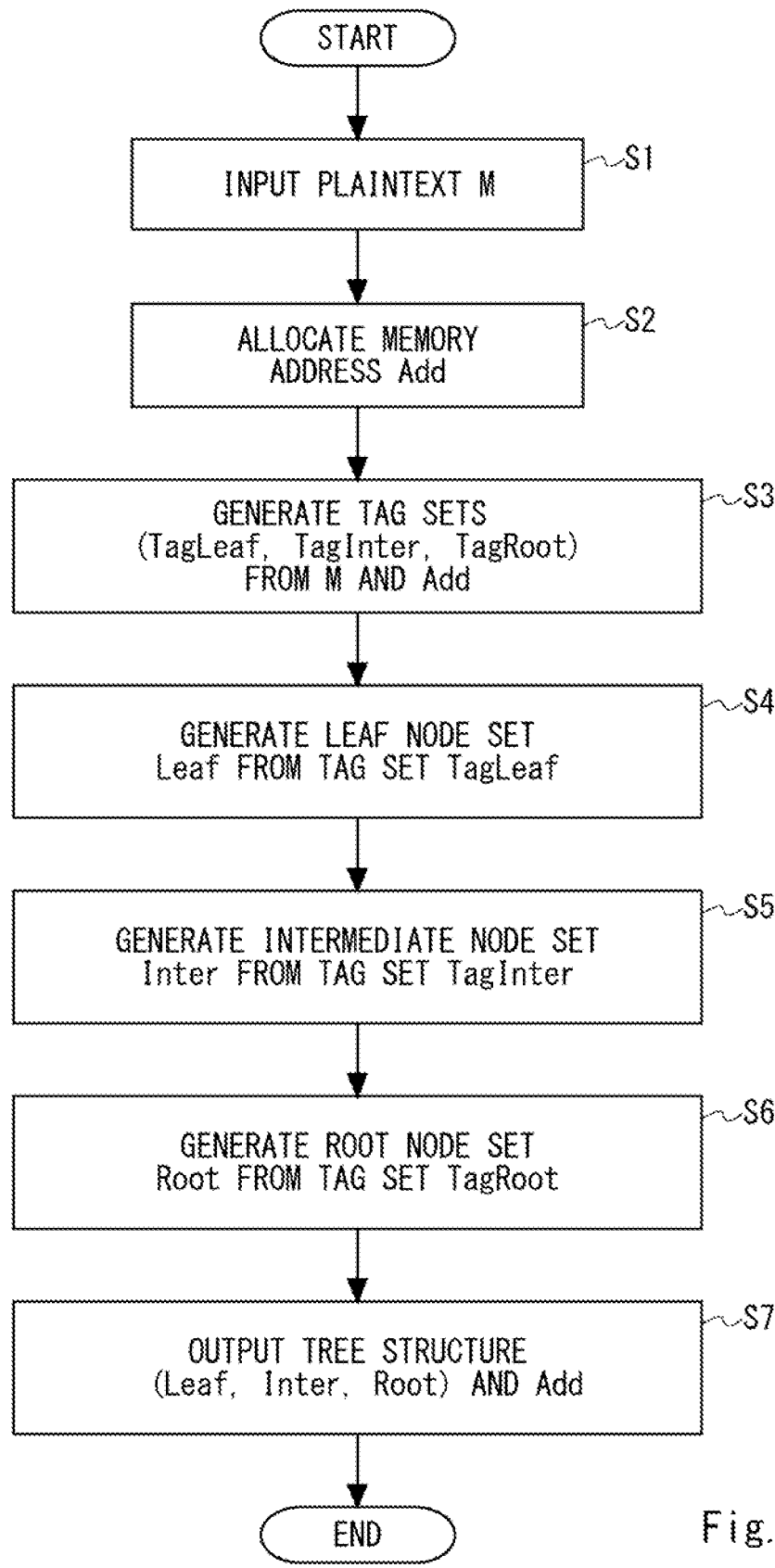
FIG. 5 is a flowchart showing operations performed by the memory structure initialization apparatus.
Figure 6:
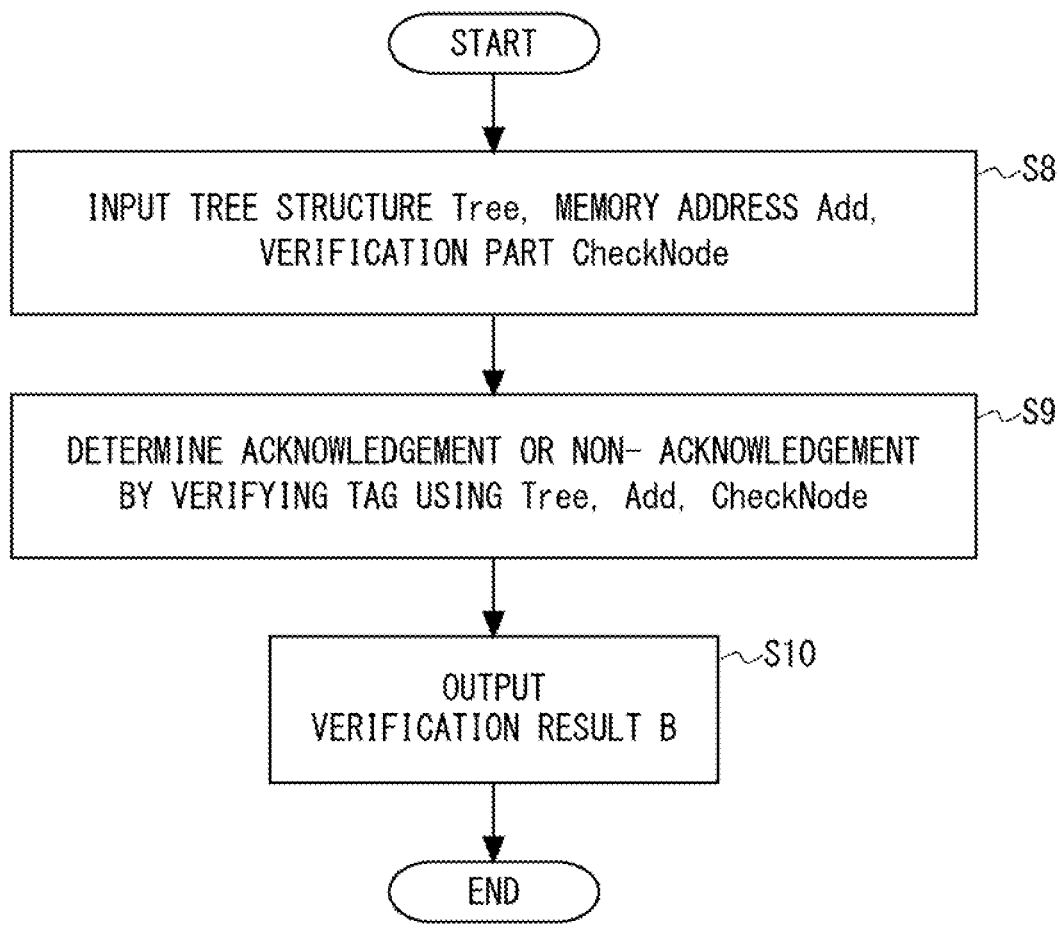
FIG. 6 is a flowchart showing operations performed by the memory verification apparatus.
Figure 7:
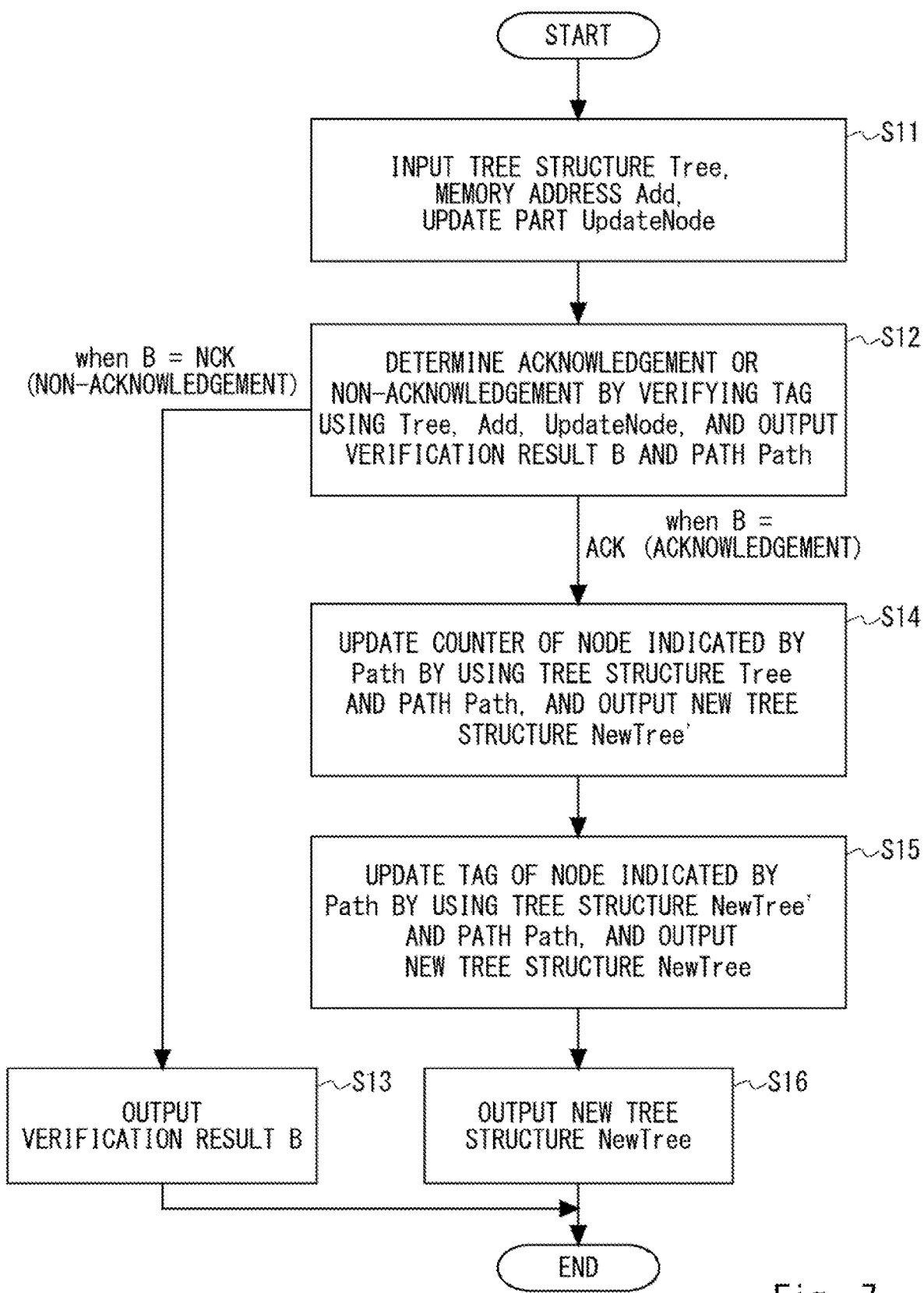
FIG. 7 is a flowchart showing operations performed by the memory updating apparatus.

FIG. 2 is a block diagram showing an example of a configuration of the memory structure initialization apparatus 10. FIG. 3 is a block diagram showing an example of a configuration of the memory verification apparatus 20. FIG. 4 is a block diagram showing an example of a configuration of the memory updating apparatus 30. F Further, FIG. 5 is a flowchart showing an example of a processing procedure performed by the memory structure initialization apparatus 10. FIG. 6 is a flowchart showing an example of a processing procedure performed by the memory verification apparatus 20. FIG. 7 is a flowchart showing an example of a processing procedure performed by the memory updating apparatus 30. FIGS. 2 to 7 will be described later.

In the memory protection system 1, the memory structure initialization apparatus 10 receives, as an input, a plaintext (a plaintext message) of which tampering with is to be detected, and outputs a tree structure in an initial state and a memory address set (i.e., a set of memory addresses) for the nodes in the tree structure. Note that a plaintext is represented by a combination of $2^d$ blocks of the plaintext. That is, the below-shown Expression 1 holds.

$$M=M[1]\|M[2]\| \ldots \|M[2^d]  \quad \text{(Expression 1)}$$

Note that M represents a plaintext, and M[ ] represents a block of the plaintext. Further, "||" represents a connection. Further, one block of the plaintext is defined as Block bits.

The memory verification apparatus 20 receives, as inputs, a place where a block(s) of a plaintext of which tampering is to be checked is stored, a tree structure, and a memory address of each of the nodes in the tree structure, and verifies whether or not the memory has been tampered. The memory updating apparatus 30 receives, as inputs, a place where a block(s) of a plaintext to be updated is stored, details of the update, a tree structure, and a memory address of each of the nodes in the tree structure. Then, the memory updating apparatus 30 outputs the updated tree structure, or an error message indicating that tampering has been detected.

Figure 8:
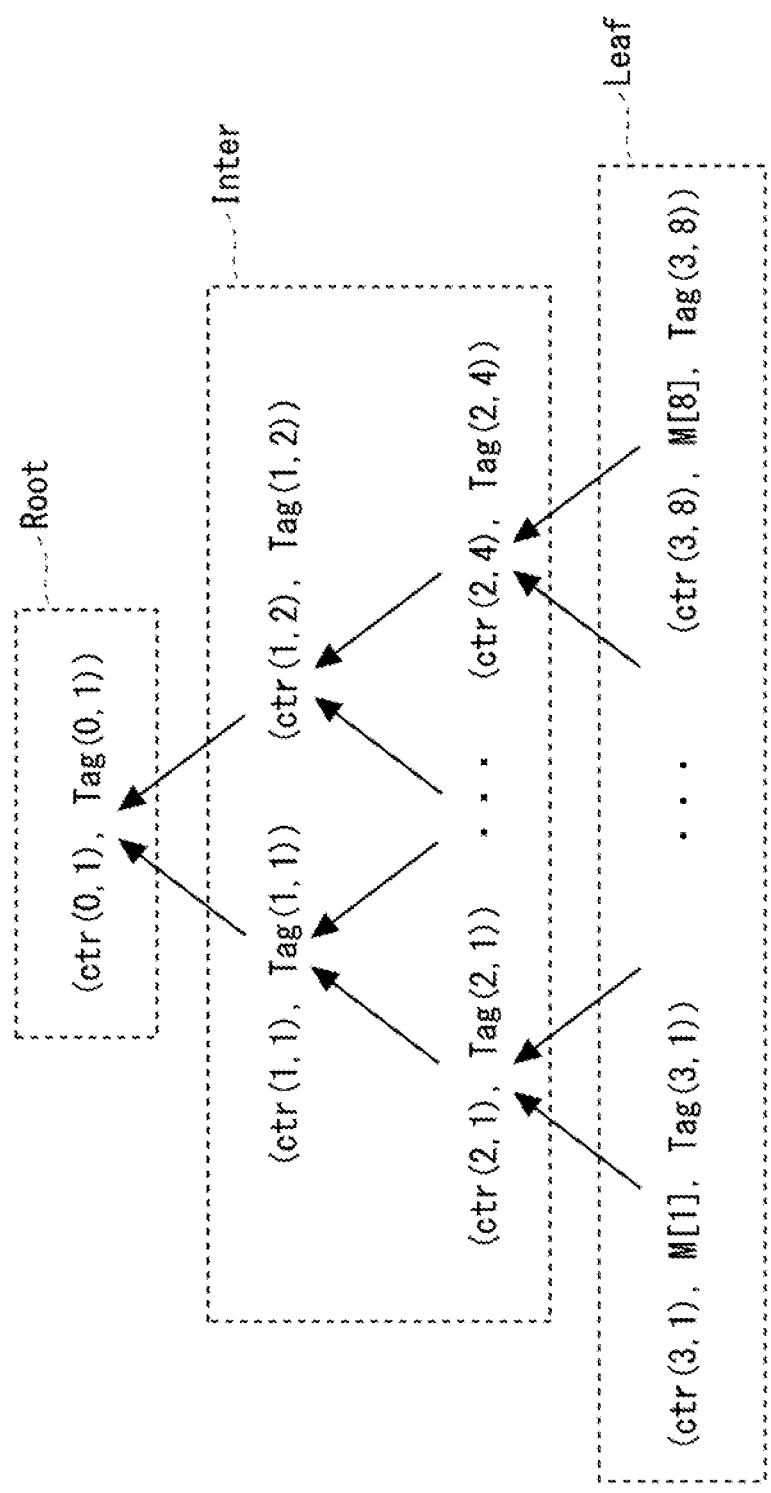
FIG. 8 shows an example of a tree structure constructed by a memory protection system according to a first example embodiment.

FIG. 8 shows an example of a tree structure constructed by the memory protection system 1 according to the first example embodiment. FIG. 8 shows a tree structure in the case where d=3. Note that Root, Inter, and Leaf will be described later.

Further, the memory protection system 1 uses, as its elementary technology, a message authentication code (MAC) having a specific property described later. In this example, a basic MAC will be described. A MAC function MAC_K using a private key K uses, as inputs, a nonce N and a plaintext M, and outputs an authentication tag Tag. That is, the memory protection system 1 performs calculation expressed by the below-shown Expression 2.

$$MAC\_K(N,M)=Tag \quad \text{(Expression 2)}$$

Further, the memory protection system 1 calculates MAC_K (N', M') for the nonce N' to be verified, the plaintext M' to be verified, and the authentication tag Tag' to be verified, and verifies whether or not the result of the calculation matches the authentication tag Tag'. When they match each other, it is determined that the nonce N' and the plaintext M' have not been tampered with, whereas when they do not match each other, it is determined that they have been tampered with. That is, the memory protection system 1 performs calculation expressed by the below-shown Expression 3.

$$MAC\_K(N',M')=Tag'' \quad \text{(Expression 3)}$$

The memory protection system 1 can determine that no tampering has been made when Tag''=Tag', and determine that tampering has been made when Tag'' ≠Tag'.

Note that the MAC used in the first example embodiment is a partially-updatable MAC (i.e., a MAC that is partially updatable) by which a partially-updatable tag (i.e., a tag that can be partially updated) can be output. That is, the output tag of the MAC used in the first example embodiment can be partially updatable. Note that the fact that the output tag of the MAC is partially updatable means that when only a part of the nonce and the plaintext of the input of the MAC is updated, the tag can be updated without referring to the whole of the changed nonce and the plaintext. That is, when the change of the input is partial, the tag can be updated more efficiently by using the partially-updatable MAC than when the tag of an ordinary MAC is updated. Such a partially-updatable MAC is called an "Incremental MAC".

For the Incremental MAC, a process for updating a partially-updatable tag is performed in addition to the processes for the ordinary MAC expressed by the Expressions 2 and 3. It is assumed that a tag for a nonce N and a plaintext M=M[1]|| . . . ||M[m] is represented by Tag, and a new tag Tag' is obtained when the nonce N is updated to a new nonce N' and M[i] is updated to M'[i] for 1<=i<=m (note that "<=" means "≤"). Here, the update of the tag in the Incremental MAC using a private key K is defined by the below-shown Expression 4.

$$IncMAC\_K((1,i),(N,M[i]),(N',M'[i]),Tag)=Tag' \quad \text{(Expression 4)}$$

In the above-shown Expression 4, i in the first argument (1, i) is a part indicating an update part of the plaintext, and may be an index of a block of the plaintext or may be any other number by which the update part can be specified. In the case where only the nonce is updated, the update of the tag is defined as the below-shown Expression 5.

$$IncMAC\_K((1,\infty),(N,\infty),(N',\infty),Tag)=Tag' \quad \text{(Expression 5)}$$

Figure 10:
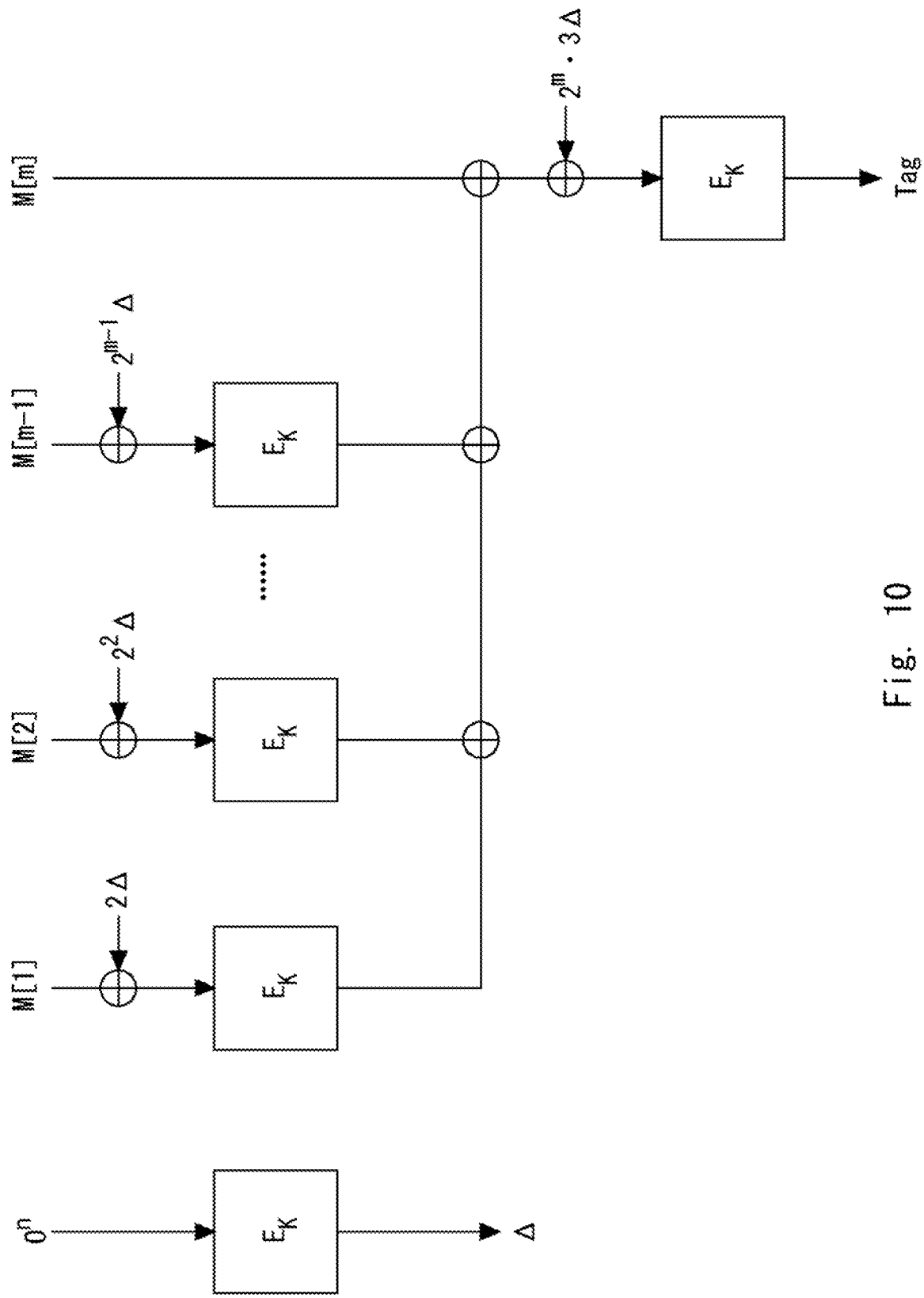
FIG. 10 shows an example of an Incremental MAC.

FIG. 10 shows an example of the Incremental MAC. For example, an example of the actual Incremental MAC is a PMAC (Parallelizable MAC) shown in FIG. 10. In FIG. 10, E_K($E_K$) represents an n-bit input/output block cipher (or block encryption) E using the private key K, which is implemented by an AES (Advanced Encryption Standard) or the like. In the case of the AES, n is equal to 128. FIG. 10 shows a method for deriving an authentication tag Tag by processing the plaintext M by the PMAC. Note that M is expressed by a connection of m pieces of n-bit blocks M[1], . . . , and M[m] of the plaintext, and $0^n$ ($0^n$) is defined as a bit string in which 0 is arranged n pieces.

The reason why the PMAC is an Incremental MAC will be described hereinafter. Firstly, the authentication tag Tag is obtained by calculating PMAC_K(M) for the plaintext M=M[1]|| . . . ||M[m]. Next, it is assumed that only a block M[m−1] in the plaintext M is updated to a different value represented by M'[m−1], and an updated tag needs to be obtained. In this case, in the case of an ordinary MAC having no Incremental property, the updated tag Tag' can be obtained by defining the updated plaintext as M'=M[1]|| . . . ||M[m−2]||M'[m−1]||M[m], and calculating PMAC_K(M'). However, the amount of calculation required for deriving Tag is equal to that for Tag'. In contrast, in the case of a PMAC having an Incremental property, Tag' can be obtained as shown by the below-shown Expression 6.

$$\Delta=3^2 \cdot E\_K(0^n)$$

$$\Sigma=D\_K(Tag)$$

$$\Sigma'=\Sigma+E\_K(M[m-1]+2^{\{m-1\}}\Delta)+E\_K(M'[m-1]+2^{\{m-1\}}\Delta)$$

$$Tag'=E\_K(\Sigma') \quad \text{(Expression 6)}$$

In the expressions, "+" represents an exclusive OR (XOR) and D_K represents an inverse function of E_K using the private key K. Further, "." represents a multiplication on a finite field GF ($2^n$). By using the above-described calculation method, the tag can be updated by only an amount of calculation corresponding to four times of encryption irrespective of the number of blocks of the plaintext, and therefore it can be said that that the above-described calculation method is efficient.

[Description of Configuration of Memory Structure Initialization Apparatus]

FIG. 2 is a block diagram showing an example of a configuration of the memory structure initialization apparatus 10. As shown in FIG. 2, the memory structure initialization apparatus 10 according to the first example embodiment includes a plaintext input unit 100, a memory address allocation unit 101, and a partially-updatable tag generation unit 102. Further, the memory structure initialization apparatus 10 includes a leaf node generation unit 103, an intermediate node generation unit 104, a root node generation unit 105, a tree structure output unit 106, and a memory address output unit 107.

The plaintext input unit 100 has a function as plaintext input means. The memory address allocation unit 101 has a function as memory address allocation means. The partially-updatable tag generation unit 102 has a function as tag generation means. The leaf node generation unit 103 has a function as leaf node generation means. The intermediate node generation unit 104 has a function as intermediate node generation means. The root node generation unit 105 has a function as root node generation means. The tree structure output unit 106 has a function as tree structure output means. The memory address output unit 107 has a function as memory address output means.

The memory structure initialization apparatus 10 is, for example, a computer. Note that the memory structure initialization apparatus 10 may implement each of the components shown in FIG. 2 by executing a software program(s) in a central processing apparatus. Further, each of the components implemented in the memory structure initialization apparatus 10 may be implemented as an individual apparatus, a functional unit, or an electronic circuit. This fact also applies to other example embodiments described later.

The plaintext input unit 100 receives an input of a plaintext M to be protected. The plaintext input unit 100 outputs the received plaintext M to the partially-updatable tag generation unit 102. Note that the method according to which the plaintext input unit 100 receives, as an input, a plaintext M is not limited to any particular methods. For example, the plaintext input unit 100 may include a text input device such as a keyboard, and may receive a user operation for inputting a plaintext M. Alternatively, the plaintext input unit 100 may receive a plaintext M from other apparatuses.

The memory address allocation unit 101 allocates, to each of the nodes in the tree structure, memory address information unique to the node. Then, the memory address allocation unit 101 outputs the memory address information to the partially-updatable tag generation unit 102 and the memory address output unit 107. Note that since the number of nodes and the amount of data in each node are determined in advance, memory addresses can be allocated before defining information about the content in each node. Further, by its nature, the memory address information is uniquely determined for each node. That is, the memory address information is unique to each node.

Note that when $1<=i<=d$, $1<=j\_i<=2^{\{i\}}$, a memory address allocated to a j_i-th node at a depth i is represented by add (i, j_i). Further, the memory address information allocated to all the nodes in the tree structure is expressed by the below-shown Expression 7.

$$Add=(add(0,1),add(1,1),add(1,2),add(2,1),\\ add(2,2),\ldots,add(d,2^{\hat{}}d-1),add(d,2^{\hat{}}d))$$ (Expression 7)

Note that "add(0, 1)" corresponds to the memory address of the root node. Further, the "add(d, 1), . . . , add(d, 2^d)" corresponds to the memory addresses of a plurality of leaf nodes. Note that the other addresses correspond to the memory addresses of intermediate nodes.

The partially-updatable tag generation unit 102 generates a partially-updatable tag for detecting tampering by using the plaintext M output from the plaintext input unit 100, the memory address set Add output from the memory address allocation unit 101, and the private key K. It is assumed that an Incremental MAC is used for generating a partially-updatable tag. Firstly, the partially-updatable tag generation unit 102 generates data expressed by the below-shown Expression 8 as a tag used in a leaf node.

$$TagLeaf=((M[1],Tag(d,1)),(M[2],Tag(d,2)),\ldots,(M[2^{\hat{}}d],Tag(d,\,2^{\hat{}}d)))$$

$$Tag(d,i)=MAC\_K(add(d,i)\|(0^{\hat{}}\{CTR-1\}\|1),M[i])$$

$$1<=i<=2^{\hat{}}d$$ (Expression 8)

Note that a∥b represents a connection of a bit string a and a bit string b. Further, CTR represents a bit length of a local counter value stored in each node, and "0^{CTR−1}" represents a bit string in which 0 is connected CTR−1 pieces. It is assumed that the value of CTR is determined in advance.

Next, the partially-updatable tag generation unit 102 generates data expressed by the below-shown Expression 9 as a tag that is used in an intermediate node. Note that IncMAC_K is the function of the Incremental MAC using the private key K. IncMAC_K uses, as inputs, an update part (1, i), a nonce before the update, a plaintext (N, M[i]) before the update, a nonce after the update, and a plaintext (N', M'[i]) after the update, and a tag Tag before the update.

$$TagInter=(Tag(1,1),\ldots,Tag(d-1,2^{\hat{}}\{d-1\}))$$

$$Tag(1,1)=MAC\_K(add(1,1)\|(0^{\hat{}}\{CTR-1\}\|1),(0^{\hat{}}\{CTR-1\}\|1)\|(0^{\hat{}}\{CTR-1\}\|1))$$

$$Tag(i,j\_i)=IncMAC\_K((1,\infty),(add(1,1)\|(0^{\hat{}}\{CTR-1\}\|1),\infty),(add(i,j\_i)\|(0^{\hat{}}\{CTR-1\}\|1),\infty),Tag(1,1))$$

$$1<=i<d-1,1<=j\_i<=2^{\hat{}}i,(i,j\_i)\neq(1,1))$$ (Expression 9)

Next, the partially-updatable tag generation unit 102 generates data expressed by the below-shown Expression 10 as a tag used in the root node.

$$TagRoot=(Tag(0,1))$$

$$Tag(0,1)=IncMAC\_K((1,\infty),(add(1,1)\|(0^{\hat{}}\{CTR-1\}\|1),\infty),(add(0,1)\|(0^{\hat{}}\{CTR-1\}\|1),\infty),Tag(1,1))$$ (Expression 10)

From the Expressions 8, 9 and 10, a tag corresponding to each node is a result of calculation of a MAC in which: a connection of a memory address of the own node and a local counter value (which will be described later) is defined as a nonce; a connection of a plurality of local counter values of child nodes is defined as a plaintext; and the nonce and the plaintext are used as inputs. That is, the tag corresponding to each node is a result of calculation of a MAC in which: a connection of the memory address of the own node and a constant is defined a nonce; a connection of a plurality of constants of child nodes is defined as a plaintext; and the nonce and the plaintext are used as inputs.

Then, the partially-updatable tag generation unit 102 outputs a tag set TagLeaf to the leaf node generation unit 103. Further, the partially-updatable tag generation unit 102 outputs a tag set TagInter to the intermediate node generation unit 104. Further, the partially-updatable tag generation unit 102 outputs a tag set TagRoot to the root node generation unit 105.

The leaf node generation unit 103 generates the leaf nodes of the tree structure by using the tag set TagLeaf output from the partially-updatable tag generation unit 102. When $1<=i<=2^d$, an i-th leaf node is generated as shown by the below-shown Expression 11.

$$(ctr(d,i), M[i], Tag(d,i)) \quad \text{(Expression 11)}$$

Note that ctr(d, i) represents the counter value of an i-th leaf node at a depth d and is incremented by one every time the node is updated. Here, ctr(d, i) is defined as ctr(d, i)=0^{CTR-1}||1 for all the index numbers i.

Further, all the leaf nodes are expressed by the below-shown Expression 12.

$$\text{Leaf}=(ctr(d,1), M[1], Tag(d,1), \ldots, (ctr(d,2^d), M[2^d], Tag(d,2^d)) \quad \text{(Expression 12)}$$

Further, the leaf node generation unit 103 outputs the generated leaf node set Leaf to the tree structure output unit 106.

The intermediate node generation unit 104 generates the intermediate nodes of the tree structure by using the tag set TagInter output from the partially-updatable tag generation unit 102. Further, when $1<=i<=d-1$, $1<=j\_i<=2^i$, a j_i-th intermediate node at a depth i is generated as shown by the below-shown Expression 13.

$$(ctr(i,j\_i), Tag(i,j\_i)) \quad \text{(Expression 13)}$$

Note that ctr(i, j_i) is defined as ctr(i, j_i)=0^{CTR-1}||1 for all the index numbers i and j_i.

Further, all the intermediate nodes are expressed by the below-shown Expression 14.

$$\text{Inter}=((ctr(1,1),Tag(1,1)),(ctr(1,2),Tag(1,2)), \ldots ,(ctr(d-1,2^{d-1}),Tag(d-1,2^{d-1}))) \quad \text{(Expression 14)}$$

Further, the intermediate node generation unit 104 outputs the generated intermediate node set Inter to the tree structure output unit 106.

The root node generation unit 105 generates the root node of the tree structure by using the tag TagRoot output from the partially-updatable tag generation unit 102. The root node is generated as shown by the below-shown Expression 15. Note that ctr(0, 1) is defined as ctr(0, 1)=0^{CTR-1}||1.

$$\text{Root}=(ctr(0,1),Tag(0,1)) \quad \text{(Expression 15)}$$

Further, the root node generation unit 105 outputs the generated root node Root to the tree structure output unit 106.

The tree structure output unit 106 connects the leaf node set Leaf output from the leaf node generation unit 103, the intermediate node set Inter output from the intermediate node generation unit 104, and the root node Root output from the root node generation unit 105. Then, the tree structure output unit 106 outputs the connected data string to a computer display, a printer, or the like.

The memory address output unit 107 outputs the memory address Add output from the memory address allocation unit 101 to the computer display, the printer, or the like.

[Description of Configuration of Memory Verification Apparatus]

FIG. 3 is a block diagram showing an example of a configuration of the memory verification apparatus 20. As shown in FIG. 3, the memory verification apparatus 20 according to the first example embodiment includes a tree structure input unit 200, a memory address input unit 201, a verification part input unit 202, a tag verification unit 203, and a verification result output unit 204.

The tree structure input unit 200 has a function as tree structure input means. The memory address input unit 201 has a function as memory address input means. The verification part input unit 202 has a function as verification part input means. The tag verification unit 203 has a function as tag verification means. The verification result output unit 204 has a function as verification result output means.

The memory verification apparatus 20 is, for example, a computer. Note that the memory verification apparatus 20 may implement each of the components shown in FIG. 3 by executing a software program(s) in a central processing apparatus. Further, each of the components implemented in the memory verification apparatus 20 may be implemented as an individual apparatus, a functional unit, or an electronic circuit. This fact also applies to other example embodiments described later.

The tree structure input unit 200 receives an input of a tree structure Tree for protecting a memory to be verified. Then, the tree structure input unit 200 outputs the tree structure Tree to the tag verification unit 203. Note that the tree structure Tree is composed of a leaf node set Leaf, an intermediate node set Inter, and a root node Root. The tree structure Tree may be a data string output from the tree structure output unit 106, in which the leaf node set Leaf, the intermediate node set Inter, and the root node Root are connected with one another.

The memory address input unit 201 receives an input of a memory address set Add allocated to the tree structure for protecting the memory to be verified. Then, the memory address input unit 201 outputs the memory address set Add to the tag verification unit 203. Note that the memory address set Add is expressed by the below-shown Expression 16.

$$\text{Add}=(add(0,1),add(1,1),add(1,2),add(2,1),add(2,2), \ldots ,add(d,2^d-1),add(d,2^d)) \quad \text{(Expression 16)}$$

Note that when $1<=i<=d$, $1<=j\_i<=2^{\{i\}}$, a memory address allocated to a j_i-th node at a depth i is represented by add (i, j_i).

The verification part input unit 202 receives an input of a verification part CheckNode of the memory. Then, the verification part input unit 202 outputs the verification part CheckNode to the tag verification unit 203. Note that the verification part CheckNode is a numerical value no smaller than 1 and no larger than $2^d$, and indicates that the verification part is a CheckNode-th leaf node.

The tag verification unit 203 verifies whether or not a part of the memory designated by the verification part CheckNode has been tampered with by using the tree structure Tree, the memory address set Add, the verification part CheckNode, and the private key K. Then, the tag verification unit 203 outputs the result of the verification to the verification result output unit 204. Firstly, the tag verification unit 203 generates a path Path from the CheckNode-th leaf node to the root node. Note that the path Path indicates a root from the aforementioned leaf node to the root node, and is expressed by the below-shown Expression 17.

$$\text{Path}=((d,p\_d),(d-1,p\_\{d-1\}),(d-2,p\_\{d-2\}), \ldots ,(1,p\_1),(0,p\_0)) \quad \text{(Expression 17)}$$

Note that when $1<=i<=d$, $1<=j\_i<=2^{\{i\}}$, each element (i, j_i) in the Path represents a j_i-th node at a depth i. Note that p_d=CheckNode, and for $0<=i<=d-1$, p_i is defined by the below-shown Expression 18.

$$p\_i = \text{ceiling}(p\_\{i+1\}/2) \quad \text{(Expression 18)}$$

Note that ceiling (·) represents a ceiling function. Further, the value of p_0 is always 1.

Figure 9:
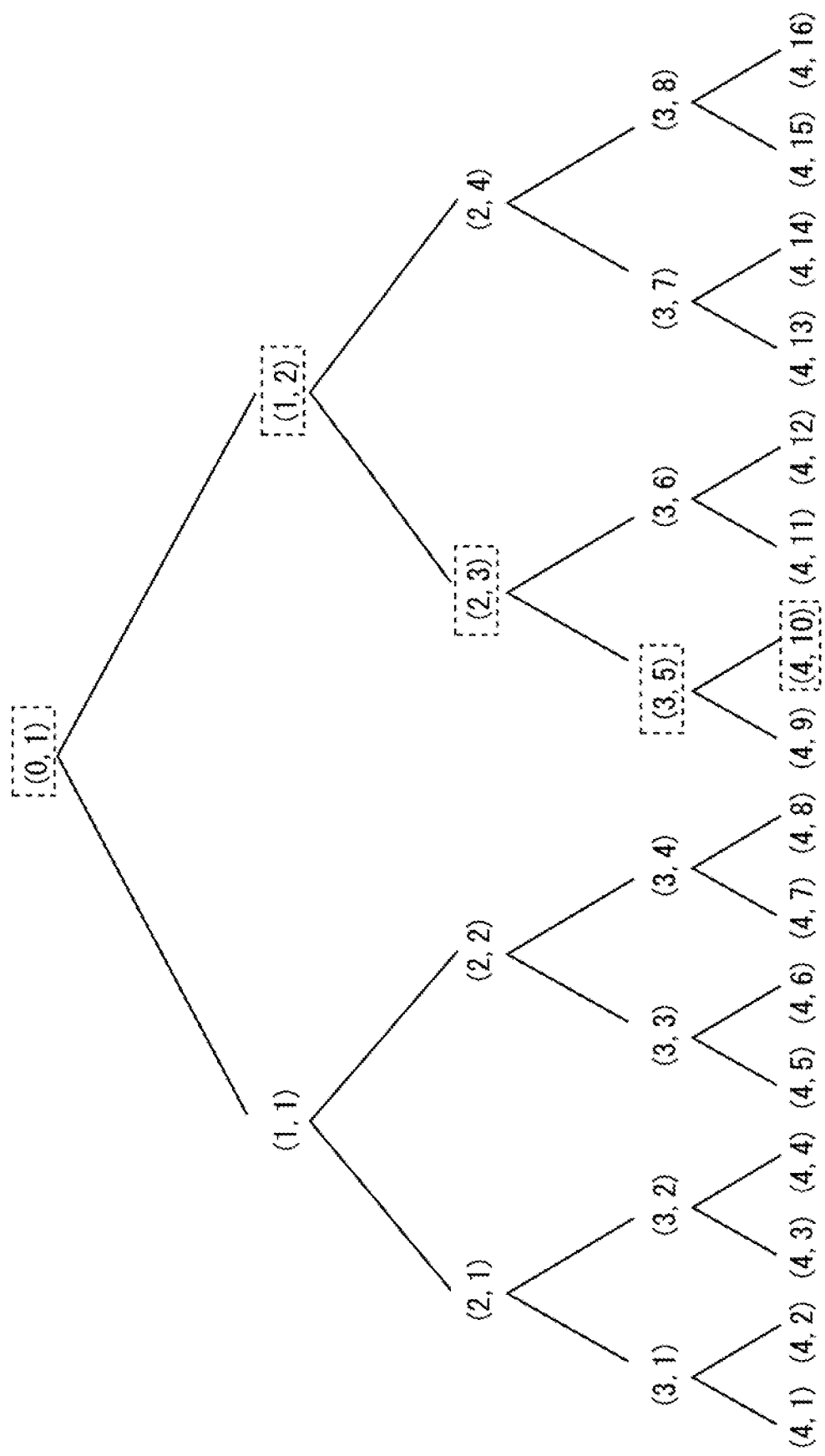
FIG. 9 shows an example of paths generated by a tag verification unit in a memory verification apparatus according to the first example embodiment.

FIG. 9 shows an example of paths generated by the tag verification unit 203 in the memory verification apparatus 20 according to the first example embodiment. For example, when d=4, CheckNode=10, as shown in FIG. 9, the Path is as follows.

$$\text{Path}=((4,10),(3,5),(2,3),(1,2),(0,1))$$

Next, the tag verification unit 203 calculates the below-shown Expression 19 by using the memory address set Add, which is the output from the memory address input unit 201, the tree structure Tree, which is the output from the tree structure input unit 200, and the private key K.

$$\text{PathTag'}=(Tag'(d,p\_d), Tag'(d-1,p\_\{d-1\}), \ldots, Tag'(0,p\_0))$$

$$Tag'(d,p\_d)=MAC\_K(add(d,p\_d)\|ctr(d,p\_d),M[p\_d])$$

$$Tag'(i,p\_i)=MAC\_K(add(i,p\_i)\|ctr(i,p\_i),ctr(i+1,2p\_i-1)\|ctr(i+1,2p\_i))$$

$$0<=i<=d-1 \quad \text{(Expression 19)}$$

Note that MAC_K is substantially the same as the method used in the partially-updatable tag generation unit 102 of the memory structure initialization apparatus 10 in the first example embodiment, and therefore the description thereof will be omitted. Further, Tag'(i, p_i) is obtained by inputting a connection of the address of the node of interest and the local counter thereof to the nonce part of the input of the MAC function, and inputting a connection of two local counters of the child nodes of the node of interest to the plaintext part thereof.

Next, the tag verification unit 203 acquires a value expressed by the below-shown Expression 20 from the tree structure Tree, which is the output from the tree structure input unit 200.

$$\text{PathTag}=(Tag(d,p\_d), Tag(d-1,p\_\{d-1\}), \ldots, Tag(0,p\_0)) \quad \text{(Expression 20)}$$

Further, the tag verification unit 203 checks whether or not PathTag' calculated by the tag verification unit 203 itself is equal to the PathTag acquired from the tree structure Tree. For $0<=i<=d$, when the equation Tag'(i, p_i)=Tag(i, p_i) holds for all the index numbers i, the tag verification unit 203 sets ACK as the result of the verification. The ACK indicates that information in the nodes related to the path has not been tampered with. The result of the verification is represented by B, and the fact that the verification result is ACK is expressed as B=ACK.

On the other hand, for $0<=i<=d$, when the relation Tag'(i, p_i)≠Tag(i, p_i) holds for at least one of the index numbers i, the tag verification unit 203 sets NCK as the result of the verification. The NCK indicates that information in a node related to the path has been tampered with. The fact that the verification result is NCK is expressed as B=NCK.

The tag verification unit 203 outputs the verification result B to the verification result output unit 204.

The verification result output unit 204 outputs the verification result B output from the tag verification unit 203 to a computer display, a printer, or the like.

[Description of Configuration of Memory Updating Apparatus]

FIG. 4 is a block diagram showing an example of a configuration of the memory updating apparatus 30. As shown in FIG. 4, the memory updating apparatus 30 according to the first example embodiment includes a tree structure input unit 300, a memory address input unit 301, an update part input unit 302, a memory verification unit 303, a counter updating unit 304, a partially-updatable tag updating unit 305, and an update result output unit 306.

The tree structure input unit 300 has a function as tree structure input means. The memory address input unit 301 has a function as memory address input means. The update part input unit 302 has a function as update part input means. The memory verification unit 303 has a function as memory verification means. The counter updating unit 304 has a function as counter updating means. The partially-updatable tag updating unit 305 has a function as tag updating means. The update result output unit 306 has a function as update result output means.

The memory updating apparatus 30 is, for example, a computer. Note that the memory updating apparatus 30 may implement each of the components shown in FIG. 3 by executing a software program(s) in a central processing apparatus. Further, each of the components implemented in the memory updating apparatus 30 may be implemented as an individual apparatus, a functional unit, or an electronic circuit. This fact also applies to other example embodiments described later.

The tree structure input unit 300 receives an input of a tree structure Tree for protecting a memory to be updated. Then, the tree structure input unit 300 outputs the tree structure Tree to the memory verification unit 303 and the counter updating unit 304 as indicated by dashed lines in FIG. 4. Note that the tree structure Tree is composed of a leaf node set Leaf, an intermediate node set Inter, and a root node Root. Note that the function of the tree structure input unit 300 is substantially the same as that of the tree structure input unit 200 in the memory verification apparatus 20 according to the first example embodiment, and therefore the description thereof will be omitted.

The memory address input unit 301 receives an input of a memory address set Add allocated to a tree structure for protecting a memory to be verified. Then, the memory address input unit 301 outputs the memory address set Add to the memory verification unit 303 and the partially-updatable tag updating unit 305 as indicated by solid lines in FIG. 4. Note that the function of the memory address input unit 301 is substantially the same as that of the memory address input unit 201 in the memory verification apparatus 20 according to the first example embodiment, and therefore the description thereof will be omitted.

The update part input unit 302 receives an input of update information UpdateNode for the memory. Then, the update part input unit 302 outputs the update information UpdateNode for the memory to the memory verification unit 303 and the partially-updatable tag updating unit 305 as indicated by dotted lines in FIG. 4. Note that the information UpdateNode is defined as UpdateNode=(UpdateIndex, UpdateInfo). UpdateIndex is a numerical value no smaller than 1 and no larger than 2^d, and indicates that the update part is an UpdateIndex-th leaf node. UpdateInfo represents Block bits of information for updating a block M[UpdateIndex] of the plaintext, which is information contained in the UpdateIndex-th leaf.

The memory verification unit 303 verifies whether or not a part of the memory designated by the UpdateNode has been tampered with by using the tree structure Tree, the memory address set Add, the update information UpdateNode for the memory, and the private key K. The process performed by the memory verification unit 303 is substantially the same as the process performed by the tag verification unit 203 in the memory verification apparatus 20 according to the first example embodiment, but only the output result is different. While the tag verification unit 203 in the memory verification apparatus 20 according to the first example embodiment outputs the verification result B, the memory verification unit 303 outputs, together with the verification result B, the path Path from the node of interest to the root node. The memory verification unit 303 outputs the verification result B to the counter updating unit 304, the partially-updatable tag updating unit 305, and the update result output unit 306, as indicated by thick broken lines in FIG. 4. Further, the memory verification unit 303 outputs the path Path to the counter updating unit 304 and the partially-updatable tag updating unit 305 as indicated by thick solid lines in FIG. 4.

The Path is expressed by the below-shown Expression 21.

$$\text{Path}=((d,p\_d),(d-1,p\_\{d-1\}),(d-2,p\_\{d-2\}),\ldots,(1,p\_1),(0,p\_0))$$ (Expression 21)

Note that it is understood, from the operation performed by the memory verification unit 303, that p_d is equal to UpdateIndex.

The counter updating unit 304 updates information in the node designated by the Path by using the tree structure Tree, the verification result B, and the path Path. When B=ACK, the following process is performed. Firstly, the counter updating unit 304 updates the counter value of the node designated by the Path by adding one to the counter value. That is, for 0<=i<=d, the counter updating unit 304 calculates the below-shown Expression 22.

$$ctr(i,p\_i) \leftarrow ctr(i,p\_i)+1$$ (Expression 22)

Note that a←b indicates that a is updated with b (i.e., updated to b). Then, the counter updating unit 304 outputs the updated tree structure NewTree' to the partially-updatable tag updating unit 305. On the other hand, when B=NCK, the counter updating unit 304 does not perform the process and does not output anything.

The partially-updatable tag updating unit 305 updates the tag of the node designated by the Path by using the updated tree structure NewTree', the memory address set Add, the update information UpdateNode for the memory, the verification result B, the path, and the private key K. When B=ACK, the partially-updatable tag updating unit 305 calculates the below-shown Expression 23 for 0<=i<=d−1.

$$Tag(d,p\_d) \leftarrow MAC\_K(add(d,p\_d)\|ctr(d,p\_d),\text{UpdateInfo})$$

$$Tag(i,p\_i) \leftarrow \text{IncMAC}\_K((1,ind\_\{i+1\}),((add(i,p\_i)\|(ctr(i,p\_i)-1)),ctr(i+1,p\_\{i+1\})-1),((add(i,p\_i)\|ctr(i,p\_i)),ctr(i+1,p\_\{i+1\})),Tag(i,p\_i))$$

$$ind\_\{i+1\}=((p\_\{i+1\}-1)\bmod 2)+1$$ (Expression 23)

Note that MAC_K and IncMAC_K are the same as the methods used in the partially-updatable tag generation unit 102 of the memory structure initialization apparatus 10 and the tag verification unit 203 of the memory verification apparatus 20 in the first example embodiment. Further, Tag(i, p_i) is obtained by inputting a connection of the address of the node of interest and the local counter thereof to the nonce part of the input of the MAC function, and inputting a connection of two local counters of the child nodes of the node of interest to the plaintext part thereof. Further, ind_{i+1} is a value indicating what number child node the node (i+1, p_{i+1}) is relative to its parent node (i, p_i). Further, the partially-updatable tag updating unit 305 outputs the updated tree structure NewTree to the update result output unit 306. On the other hand, when B=NCK, the partially-updatable tag updating unit 305 does not perform the process and does not output anything.

The update result output unit 306 outputs the update result by using the verification result B output from the memory verification unit 303 and the tree structure NewTree output from the partially-updatable tag updating unit 305. When B=ACK, the update result output unit 306 outputs the tree structure NewTree to a computer display, a printer, or the like. On the other hand, when B=NCK, the update result output unit 306 outputs "Verification result B=NCK" to the computer display, the printer, or the like.

Description of Operation

FIG. 5 is a flowchart showing operations (a memory structure initialization method) performed by the memory structure initialization apparatus 10. In a step S1, the plaintext input unit 100 receives an input of a plaintext M to be protected. In a step S2, the memory address allocation unit 101 allocates a memory address to each of nodes in a tree structure, and thereby generates a memory address set Add. In a step S3, the partially-updatable tag generation unit 102 generates tag sets (TagLeaf, TagInter, and TagRoot) for detecting tampering by using the plaintext M and the memory address set Add.

In a step S4, the leaf node generation unit 103 generates a leaf node set Leaf of the tree structure by using the tag set TagLeaf output from the partially-updatable tag generation unit 102. In a step S5, the intermediate node generation unit 104 generates an intermediate node set Inter of the tree structure by using the tag set TagInter output from the partially-updatable tag generation unit 102. In a step S6, the root node generation unit 105 generates the root node Root of the tree structure by using the tag TagRoot output from the partially-updatable tag generation unit 102.

In a step S7, the tree structure output unit 106 connects the leaf node set Leaf, the intermediate node set Inter, and the root node Root with one another, and outputs the connected data string representing the tree structure to a computer display, a printer, or the like. Further, the memory address output unit 107 outputs the memory address Add output from the memory address allocation unit 101 to the computer display, the printer, or the like. After the step S7, the memory structure initialization apparatus 10 finishes the processes shown in FIG. 5.

FIG. 6 is a flowchart showing operations (a memory verification method) performed by the memory verification apparatus 20. In a step S8, the tree structure input unit 200 receives an input of a tree structure Tree for protecting a memory to be verified. Note that the tree structure Tree is composed of a leaf node set Leaf, an intermediate node set Inter, and a root node Root. Further, the memory address input unit 201 receives an input of a memory address set Add allocated to the tree structure for protecting the memory to be verified. Further, the verification part input unit 202 receives an input of a verification part CheckNode of the memory.

In a step S9, the tag verification unit 203 verifies whether or not a part of the memory designated by the CheckNode has been tampered with by using the tree structure Tree, the memory address set Add, and the CheckNode. Further, the tag verification unit 203 determines acknowledgement (ACK) or non-acknowledgement (NCK), and outputs a verification result B according to the determination. In a step S10, the verification result output unit 204 outputs the verification result B to a computer display, a printer, or the like. After the step S10, the memory verification apparatus 20 finishes the processes shown in FIG. 6.

FIG. 7 is a flowchart showing operations (a memory updating method) performed by the memory updating apparatus 30. In a step S11, the tree structure input unit 300 receives an input of a tree structure Tree for protecting a memory to be updated. Note that the tree structure Tree is composed of a leaf node set Leaf, an intermediate node set Inter, and a root node Root. Further, the memory address input unit 301 receives an input of a memory address set Add allocated to the tree structure for protecting the memory to be verified. Further, the update part input unit 302 receives an input of update information UpdateNode for the memory. Note that the update information UpdateNode is defined as UpdateNode=(UpdateIndex, UpdateInfo).

In a step S12, the memory verification unit 303 verifies whether or not a part of the memory designated by the update information UpdateNode has been tampered with by using the tree structure Tree, the memory address set Add, and the update information UpdateNode. Further, the memory verification unit 303 determines acknowledgement (ACK) or non-acknowledgement (NCK), and outputs a verification result B according to the determination. Then, the memory verification unit 303 outputs the verification result B and the path Path used for the memory verification. When B=ACK, i.e., when tampering with the memory is not detected (S12: B=ACK (acknowledgement)), the process proceeds to a step S14. When B=NCK, i.e., when tampering with the memory is detected (S12: B=NCK (non-acknowledgement)), the process proceeds to a step S13.

In a step S13, the update result output unit 306 outputs the verification result B output from the memory verification unit 303 to a computer display, a printer, or the like. After the step S13, the memory updating apparatus 30 finishes the processes shown in FIG. 7.

In the step S14, the counter updating unit 304 updates the counter of the node designated by the Path by using the tree structure Tree output from the tree structure input unit 300 and the path Path output from the memory verification unit 303, and outputs an updated tree structure NewTree'. In a step S15, the partially-updatable tag updating unit 305 updates the tag of the node designated by a technology h disclosed in Patent Literature 2 by using the tree structure NewTree', the memory address set Add, the update information UpdateNode for the memory, the verification result B, and the technology h disclosed in Patent Literature 2. Then, the partially-updatable tag updating unit 305 outputs the updated tree structure NewTree.

In a step S16, the update result output unit 306 outputs the tree structure NewTree output from the partially-updatable tag updating unit 305. After the step S16, the memory updating apparatus 30 finishes the processes shown in FIG. 7.

Description of Effect

In the first example embodiment, it is possible to efficiently generate and update a tag by using Incremental MAC with a tree structure in which parallel processing is possible. That is, it is possible to generate and update a tag more efficiently in the partially-updatable tag generation unit 102 in the memory structure initialization apparatus 10 or in the partially-updatable tag updating unit 305 in the memory updating apparatus 30 than in Patent Literatures 2 and 3, and Non-patent Literatures 1 and 2. In other words, it is possible to construct a tree structure, which needs to be performed first for protecting a memory, more efficiently, and to perform writing to the memory more efficiently. That is, in the first example embodiment, it is possible to reduce the amount of processing required for writing to the memory. Further, this effect becomes more prominent as the length of the nonce or the length of the counter increases.

Second Example Embodiment

Next, a second example embodiment will be described. The following description and drawings are partially omitted and simplified as appropriate for clarifying the explanation. Further, the same reference numerals (or symbols) are assigned to the same components/structures throughout the drawings, and redundant descriptions thereof are omitted as appropriate. Therefore, in the following description, parts different from those in the above-described first example embodiment will be mainly described. In the second example embodiment, an example in which the number of branches (i.e., the number of branches at each node) of a tree structure constructed by a memory protection system is represented by b and a depth is represented by d will be described. That is, the number of leaf nodes in the second example embodiment is expressed as $b^d$.

Figure 11:
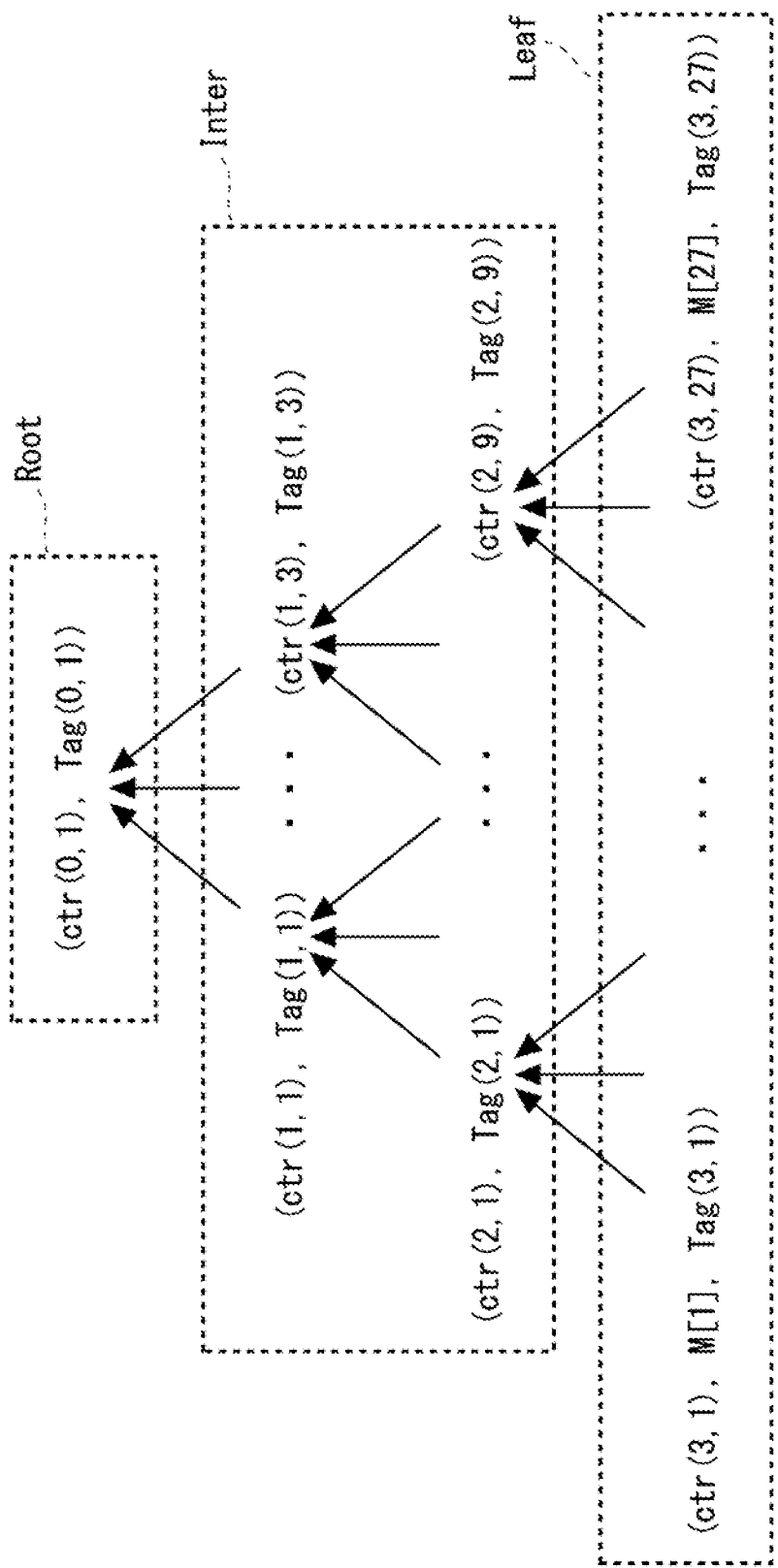
FIG. 11 shows an example of a tree structure constructed by a memory protection system according to a second example embodiment.

FIG. 11 shows an example of a tree structure constructed by a memory protection system according to the second example embodiment. FIG. 11 shows a tree structure in the case where the number of branches b=3 (i.e., the number of branches at each node b=3) and the depth d=3. Note that Root, Inter, and Leaf are substantially the same as those in the above-described first example embodiment.

A memory protection system 1a according to the second example embodiment includes a memory structure initialization apparatus 10a, a memory verification apparatus 20a, and a memory updating apparatus 30a. The memory protection system 1a detects tampering with a memory. In the memory protection system 1a, the memory structure initialization apparatus 10a receives, as an input, a plaintext of which tampering with is to be detected, and outputs a tree structure in an initial state and a memory address set for the nodes in the tree structure. Note that a plaintext is represented by a combination of $b^d$ blocks of the plaintext. That is, the below-shown Expression 24 holds.

$$M=M[1]\|M[2]\| \ldots \|M[b^d] \quad \text{(Expression 24)}$$

Further, one block of the plaintext is defined as Block bits.

The memory verification apparatus 20a receives, as inputs, a place where a block(s) of a plaintext of which tampering is to be checked is stored, a tree structure, and a memory address of each of the nodes in the tree structure, and verifies whether or not the memory has been tampered. The memory updating apparatus 30a receives, as inputs, a place where a block(s) of a plaintext to be updated is stored, details of the update, a tree structure, and a memory address of each of the nodes in the tree structure. The memory updating apparatus 30a outputs the updated tree structure, or an error message indicating that tampering has been detected.

[Description of Configuration of Memory Structure Initialization Apparatus]

The memory structure initialization apparatus 10a according to the second example embodiment includes a plaintext input unit 100, a memory address allocation unit 101a, and a partially-updatable tag generation unit 102a. Further, the memory structure initialization apparatus 10a according to the second example embodiment includes a leaf node generation unit 103a, an intermediate node generation unit 104a, a root node generation unit 105, a tree structure output unit 106, and a memory address output unit 107. Note that the plaintext input unit 100 is substantially the same as the plaintext input unit 100 in the memory structure initialization apparatus 10 according to the first example embodiment, and therefore the description thereof will be omitted.

The memory address allocation unit 101a allocates memory address information to each of nodes in a tree structure. When $1<=i<=d$, $1<=j\_i<=b\textasciicircum\{i\}$, a memory address allocated to a j_i-th node at a depth i is represented by add (i, j_i). Further, the memory address information allocated to all the nodes in the tree structure is expressed by the below-shown Expression 25.

$$Add=(add(0,1),add(1,1),add(1,2),\ldots,add(1,b),add(2,1),add(2,2),\ldots,add(d,bad-1),add(d,b\textasciicircum d)) \quad \text{(Expression 25)}$$

The partially-updatable tag generation unit 102a generates a tag for detecting tampering by using the plaintext M output from the plaintext input unit 100, the memory address set Add output from the memory address allocation unit 101a, and the private key K. Firstly, the partially-updatable tag generation unit 102a generates data expressed by the below-shown Expression 26 as a tag used in a leaf node.

$$TagLeaf=(M[1],Tag(d,1),(M[2],Tag(d,2),\ldots,(M[b\textasciicircum d],Tag(d,b\textasciicircum d)))$$

$$Tag(d,i)=MAC\_K(add(d,i)\|(0\textasciicircum\{CTR-1\}\|1),M[i])$$

$$1<=i<=b\textasciicircum d \quad \text{(Expression 26)}$$

Note that a∥b represents a connection of a bit string a and a bit string b. Further, CTR represents a bit length of a local counter value stored in each node, and $0\textasciicircum\{CTR-1\}$ represents a bit string in which 0 is connected CTR−1 pieces. It is assumed that the value of CTR is determined in advance.

Next, the partially-updatable tag generation unit 102a generates data expressed by the below-shown Expression 27 as a tag that is used in an intermediate node.

$$TagInter=(Tag(1,1),\ldots,Tag(d-1,b\textasciicircum\{d-1\}))$$

$$Tag(1,1)=MAC\_K(add(1,1)\|(0\textasciicircum\{CTR-1\}\|1),(0\textasciicircum\{CTR-1\}\|1)\textasciicircum b)$$

$$Tag(i,j\_i)=IncMAC\_K((1,\infty),(add(1,1)\|(0\textasciicircum\{CTR-1\}\|1),\infty),(add(i,j\_i)\|(0\textasciicircum\{CTR-1\}\|1),\infty),Tag(1,1))$$

$$1<=i<=d-1, 1<=j\_i<=b\textasciicircum i, (i,j\_i) \neq (1,1) \quad \text{(Expression 27)}$$

Note that in the derivation part of Tag (1, 1), the second input $(0\textasciicircum\{CTR-1\} \|1) \textasciicircum b$ of MAC_K represents a value obtained by $(0\textasciicircum\{CTR-1\}\|1)$ is connected b pieces.

Next, the partially-updatable tag generation unit 102a generates data expressed by the below-shown Expression 28 as a tag used in the root node.

$$TagRoot=(Tag(0,1))$$

$$Tag(0,1)=IncMAC\_K(1,\infty),(add(1,1)\|(0\textasciicircum\{CTR-1\}\|1),\infty),(add(0,1)\|(0\textasciicircum\{CTR-1\}\|1),\infty),Tag(1,1)) \quad \text{(Expression 28)}$$

From the Expressions 26, 27 and 28, a tag corresponding to each node is a result of calculation of a MAC in which: a connection of a memory address of the own node and a local counter value is defined as a nonce; a connection of a plurality of local counter values of b child nodes is defined as a plaintext; and the nonce and the plaintext are used as inputs.

Then, the partially-updatable tag generation unit 102a outputs a tag set TagLeaf to the leaf node generation unit 103a. Further, the partially-updatable tag generation unit 102a outputs a tag set TagInter to the intermediate node generation unit 104a. Further, the partially-updatable tag generation unit 102a outputs a tag set TagRoot to the root node generation unit 105.

The leaf node generation unit 103a generates the leaf nodes of the tree structure by using the tag set TagLeaf output from the partially-updatable tag generation unit 102a. When $1<=i<=b\textasciicircum d$, an i-th leaf node is generated as shown by the below-shown Expression 29.

$$(ctr(d,i),M[i],Tag(d,i)) \quad \text{(Expression 29)}$$

Note that ctr(d, i) represents the counter value of an i-th leaf node at a depth d, and is incremented by one every time the node of interest is updated. Here, ctr(d, i) is defined as ctr(d, i)=$0\textasciicircum\{CTR-1\}\|1$ for all the index numbers i.

Further, all the leaf nodes are expressed by the below-shown Expression 30.

$$Leaf=((ctr(d,1),M[1],Tag(d,1)),\ldots,(ctr(d,b\textasciicircum d),M[b\textasciicircum d],Tag(d,b\textasciicircum d))) \quad \text{(Expression 30)}$$

Further, the leaf node generation unit 103a outputs the generated leaf node set Leaf to the tree structure output unit 106.

The intermediate node generation unit 104a generates the intermediate nodes of the tree structure by using the tag set TagInter output from the partially-updatable tag generation unit 102a. Further, when $1<=i<=d-1$, $1<=j\_i<=b\textasciicircum i$, a j_i-th intermediate node at a depth i is generated as shown by the below-shown Expression 31.

$$(ctr(i,j\_i),Tag(i,j\_i)) \quad \text{(Expression 31)}$$

Note that ctr(i, j_i) is defined as ctr(i, j_i)=$0\textasciicircum\{CTR-1\}\|1$ for all the index numbers i and j_i.

Further, all the intermediate nodes are expressed by the below-shown Expression 32.

$$Inter=((ctr(1,1),Tag(1,1)),(ctr(1,2),Tag(1,2)),\ldots,(ctr(d-1,b\textasciicircum\{d-1\}),Tag(d-1,b\textasciicircum\{d-1\}))) \quad \text{(Expression 32)}$$

Further, the intermediate node generation unit 104a outputs the generated intermediate node set Inter to the tree structure output unit 106.

The root node generation unit 105 is substantially the same as the root node generation unit 105 in the memory structure initialization apparatus 10 according to the first example embodiment, and therefore the description thereof will be omitted. The tree structure output unit 106 is substantially the same as the tree structure output unit 106 in the memory structure initialization apparatus 10 according to the first example embodiment, and therefore the description thereof will be omitted. The memory address output unit 107 is substantially the same as the memory address output unit 107 in the memory structure initialization apparatus 10 according to the first example embodiment, and therefore the description thereof will be omitted.

[Description of Configuration of Memory Verification Apparatus]

The memory verification apparatus 20a according to the second example embodiment includes a tree structure input unit 200, a memory address input unit 201a, a verification part input unit 202a, a tag verification unit 203a, and a verification result output unit 204. The tree structure input unit 200 is substantially the same as the tree structure input unit 200 in the memory verification apparatus 20 according to the first example embodiment, and therefore the description thereof will be omitted.

The memory address input unit 201a receives an input of a memory address set Add allocated to a tree structure for protecting a memory to be verified. Then, the memory address input unit 201a outputs the memory address set Add to the tag verification unit 203a. Note that the memory address set Add is expressed by the below-shown Expression 33.

$$Add=(add(0,1),add(1,1),add(1,2),\ldots,add(1,b),add(2,1),add(2,2),\ldots,add(d,b\hat{\ }d-1),add(d,b\hat{\ }d) \quad \text{(Expression 33)}$$

Note that when $1<=i<=d$, $1<=j\_i<=b\hat{\ }\{i\}$, a memory address allocated to a j_i-th node at a depth i is represented by add (i, j_i).

The verification part input unit 202a receives an input of a verification part CheckNode of the memory. Then, the verification part input unit 202a outputs the verification part CheckNode to the tag verification unit 203a. Note that the verification part CheckNode is a numerical value no smaller than 1 and no larger than b^d, and indicates that the verification part is a CheckNode-th leaf node.

The tag verification unit 203a verifies whether or not a part of the memory designated by the verification part CheckNode has been tampered with by using the tree structure Tree, the memory address set Add, the verification part CheckNode, and the private key K. Then, the tag verification unit 203a outputs the verification result to the verification result output unit 204. Firstly, the tag verification unit 203a generates a path Path from the CheckNode-th leaf node to the root node by calculating the below-shown Expression 34.

$$\text{Path}=(d,p\_d),(d-1,p\_\{d-1\}),(d-2,p\_\{d-2\}),\ldots,(1,p\_1),(0,p\_0) \quad \text{(Expression 34)}$$

Note that when $1<=i<=d$, $1<=j\_i<=b\hat{\ }\{i\}$, each element (i, j_i) in the Path represents a j_i-th node at a depth i. Note that p_d=CheckNode, and for $0<=i<=d-1$, p_i is defined by the below-shown Expression 35.

$$p\_i=\text{ceiling}(p\_\{i+1\}/b) \quad \text{(Expression 35)}$$

Note that ceiling (·) represents a ceiling function. Further, the value of p_0 is always 1.

Next, the tag verification unit 203a calculates the below-shown Expression 36 by using the memory address set Add, which is the output from the memory address input unit 201a, the tree structure Tree, which is the output from the tree structure input unit 200, and the private key K.

$$\text{PathTag}'=(Tag'(d,p\_d),Tag'(d-1,p\_\{d-1\}),\ldots,Tag'(0,p\_0))$$

$$Tag'(d,p\_d)=MAC\_K(add(d,p\_d)\|ctr(d,p\_d),M[p\_d])$$

$$Tag'(i,p\_i)=MAC\_K(add(i,p\_i)\|ctr(i,p\_i),ctr(i+1,b\cdot p\_i-(b-1))\|\cdot\|ctr(i+1,b\cdot p\_i-1)\|ctr(i+1,b,p\_i))$$

$$0<=i<=d-1 \quad \text{(Expression 36)}$$

Note that MAC_K is substantially the same as the method used in the partially-updatable tag generation unit 102a of the memory structure initialization apparatus 10a in the second example embodiment, and therefore the description thereof will be omitted. Further, Tag'(i, p_i) is obtained by inputting a connection of the address of the node of interest and the local counter thereof to the nonce part of the input of the MAC function, and inputting a connection of b local counters of the child nodes of the node of interest to the plaintext part thereof.

Next, the tag verification unit 203a acquires a value expressed by the below-shown Expression 37 from the tree structure Tree, which is the output from the tree structure input unit 200.

$$\text{PathTag}=(Tag(d,p\_d),Tag(d-1,p\_\{d-1\}),\ldots,Tag(0,p\_0)) \quad \text{(Expression 37)}$$

Further, the tag verification unit 203a checks whether or not PathTag' calculated by the tag verification unit 203a itself is equal to the PathTag acquired from the tree structure Tree. For $0<=i<=d$, when the equation Tag'(i, p_i)=Tag(i, p_i) holds for all the index numbers i, the tag verification unit 203a sets ACK as the verification result. The ACK indicates that information in the nodes related to the path has not been tampered with. The verification result is represented by B, and the fact that the verification result is ACK is expressed as B=ACK.

On the other hand, for $0<=i<=d$, when the relation Tag'(i, p_i)≠Tag(i, p_i) holds for at least one of the index numbers i, the tag verification unit 203a sets NCK as the verification result. The NCK indicates that information in a node related to the path has been tampered with. The fact that the verification result is NCK is expressed as B=NCK.

The tag verification unit 203a outputs the verification result B.

The verification result output unit 204 is substantially the same as the verification result output unit 204 in the memory verification apparatus 20 according to the first example embodiment, and therefore the description thereof will be omitted.

[Description of Configuration of Memory Updating Apparatus]

The memory updating apparatus 30a according to the second example embodiment includes a tree structure input unit 300, a memory address input unit 301a, an update part input unit 302a, a memory verification unit 303a, a counter updating unit 304, a partially-updatable tag updating unit 305a, and an update result output unit 306. The tree structure input unit 300 is substantially the same as the tree structure input unit 300 in the memory updating apparatus 30 will be omitted.

The memory address input unit 301a receives an input of a memory address set Add allocated to a tree structure for protecting a memory to be verified. Then, the memory address input unit 301a outputs the memory address set Add to the memory verification unit 303a and the partially-updatable tag updating unit 305a. The function of the memory address input unit 301a is substantially the same as that of the memory address input unit 201a in the memory verification apparatus 20a according to the second example embodiment, and therefore the description thereof will be omitted.

The update part input unit 302a receives an input of update information UpdateNode for the memory. Then, the update part input unit 302a outputs the update information UpdateNode for the memory to the memory verification unit 303a and the partially-updatable tag updating unit 305a. Note that the information UpdateNode is defined as UpdateNode=(UpdateIndex, UpdateInfo). UpdateIndex is a numerical value no smaller than 1 and no larger than b^d, and indicates that the update part is an UpdateIndex-th leaf node. UpdateInfo represents Block bits of information for updating a block M[UpdateIndex] of the plaintext, which is information contained in the UpdateIndex-th leaf.

The memory verification unit 303a verifies whether or not a part of the memory designated by the UpdateNode has been tampered with by using the tree structure Tree, the memory address set Add, the update information UpdateNode for the memory, and the private key K. The process performed by the memory verification unit 303a is the same as the process performed by the tag verification unit 203a in the memory verification apparatus 20a according to the second example embodiment, but only the output result is different. While the tag verification unit 203a in the memory verification apparatus 20a according to the second example embodiment outputs the verification result B, the memory verification unit 303a outputs, together with the verification result B, the path Path from the node of interest to the root node. The memory verification unit 303a outputs the verification result B to the counter updating unit 304, the partially-updatable tag updating unit 305a, and the update result output unit 306. Further, the memory verification unit 303a outputs the path Path to the counter updating unit 304 and the partially-updatable tag updating unit 305a.

The Path is expressed by the below-shown Expression 38.

$$\text{Path} = (d, p\_d), (d-1, p\_\{d-1\}), (d-2, p\_\{d-2\}), \ldots, (1, p\_1), (0, p\_0) \quad \text{(Expression 38)}$$

Note that it is understood, from the operation performed by the memory verification unit 303a, that p_d is equal to UpdateIndex.

The counter updating unit 304 is substantially the same as the counter updating unit 304 in the memory updating apparatus 30 according to the first example embodiment, and therefore the description thereof will be omitted.

The partially-updatable tag updating unit 305a updates the tag of the node designated by the Path by using the updated tree structure NewTree', the memory address set Add, the update information UpdateNode for the memory, the verification result B, the Path, and the private key K. When B=ACK, the partially-updatable tag updating unit 305a calculates the below-shown Expression 39 for $0 <= i <= d-1$.

$$Tag(d, p\_d) \leftarrow MAC\_K(add(d, p\_d) \| ctr(d, p\_d), \text{UpdateInfo})$$

$$Tag(i, p\_i) \leftarrow IncMAC\_K((1, ind\_\{i+1\}), ((add(i, p\_i) \| ctr(i, p\_i)-1)), ctr(i+1, p\_\{i+1\})-1), ((add(i, p\_i) \| ctr(i, p\_i)), ctr(i+1, p\_\{i+1\})), Tag(i, p\_i))$$

$$ind\_\{i+1\} = ((p\_\{i+1\}-1) \bmod (b)) + 1 \quad \text{(Expression 39)}$$

Note that MAC_K and IncMAC_K are substantially the same as the methods used in the partially-updatable tag generation unit 102a of the memory structure initialization apparatus 10a and the tag verification unit 203a of the memory verification apparatus 20a in the second example embodiment, therefore the description thereof will be omitted. Further, ind_{i+1} is a value indicating what number child node the node (i+1, p_{i+1}) is relative to its parent node (i, p_i). Further, the partially-updatable tag updating unit 305a outputs the updated tree structure NewTree to the update result output unit 306. On the other hand, when B=NCK, the partially-updatable tag updating unit 305a does not perform the process and does not output anything.

The update result output unit 306 is substantially the same as the update result output unit 306 in the memory updating apparatus 30 according to the first example embodiment, and therefore the description thereof will be omitted.

Description of Effect

The effects provided by the second example embodiment are substantially the same as those provided by the first example embodiment. However, while it is assumed that the tree structure is a binary tree in the first example embodiment, the number of branches (i.e., the number of branches at each node) of the tree structure is arbitrary in the second example embodiment. The update of a tag implemented by the partially-updatable tag generation unit 102a in the memory structure initialization apparatus 10a and by the partially-updatable tag updating unit 305a in the memory updating apparatus 30a is the update of only a nonce or the update of a counter value only in one child node. Therefore, the larger the number of branches in the tree structure is, the more the effect that is obtained by using Incremental MAC becomes prominent. Specifically, in Patent Literatures 2 and 3, and Non-patent Literatures 1 and 2, the amount of MAC processing for each node that is performed when a tree structure is generated or updated increases in proportion to the increase in the number of branches. However, in the second example embodiment, the amount of MAC processing for each node that is performed when a tree structure is generated or updated is unchanged irrespective of the number of branches. Therefore, it is possible to reduce the amount of processing irrespective of the number of branches.

Third Example Embodiment

Next, a third example embodiment will be described. The following description and drawings are partially omitted and simplified as appropriate for clarifying the explanation. Further, the same reference numerals (or symbols) are assigned to the same components/structures throughout the drawings, and redundant descriptions thereof are omitted as appropriate. Therefore, in the following description, parts different from those in the above-described first example embodiment will be mainly described. In the third example embodiment, an example of a memory protection system which, in addition to verifying a memory, encrypts an input plaintext and keeps it secret will be described. However, similarly to the first example embodiment, it is defined that the number of branches of a tree structure constructed by a memory protection system 1c according to the third example embodiment is two and a depth thereof is d.

Figure 12:
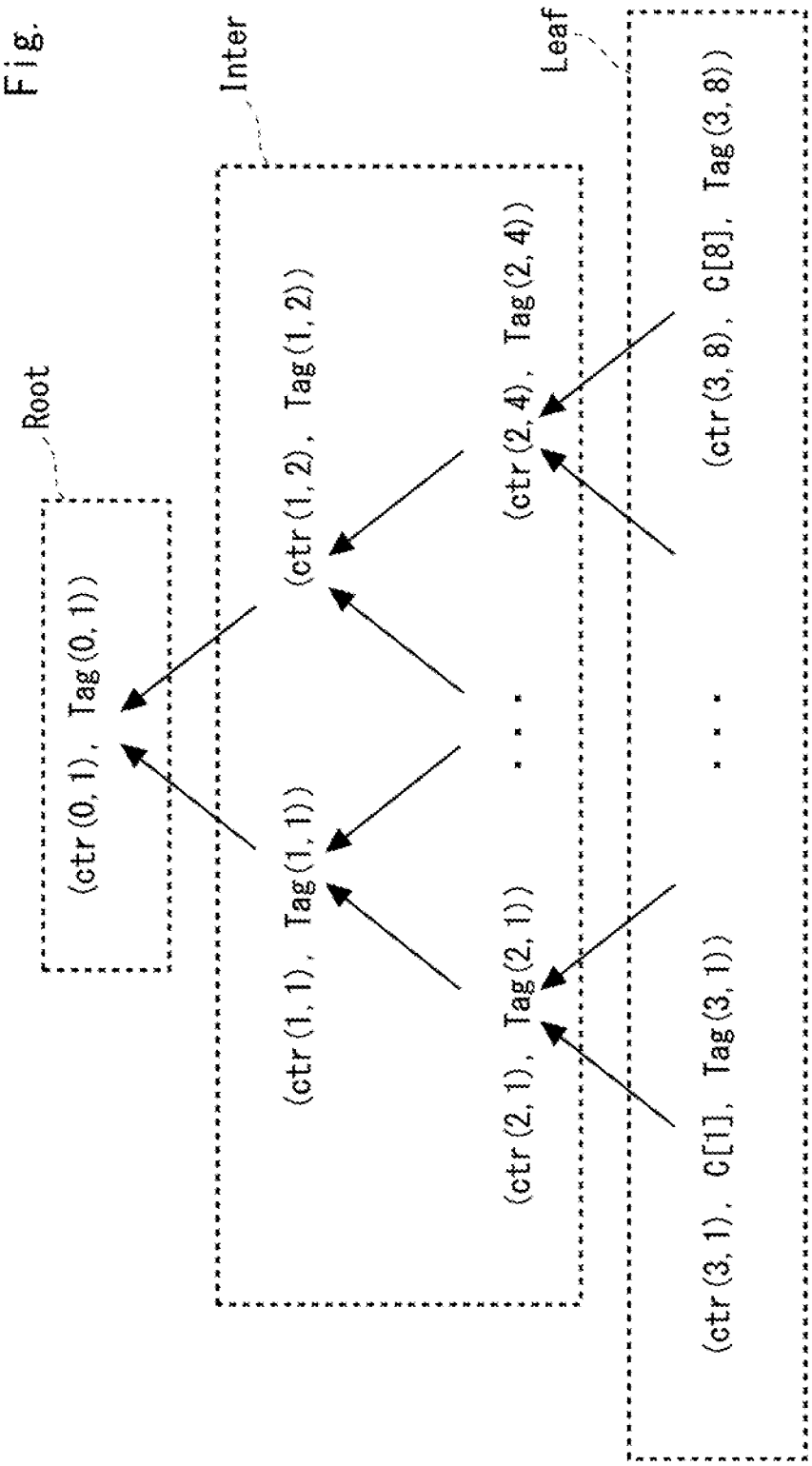
FIG. 12 shows an example of a tree structure constructed by a memory protection system according to a third example embodiment.

FIG. 12 shows an example of a tree structure constructed by a memory protection system according to the third example embodiment. FIG. 12 shows a tree structure in the case where the number of branches b=2 and the depth d=3. Note that Root, Inter, and Leaf are substantially the same as those in the above-described first example embodiment.

The memory protection system 1c according to the third example embodiment includes a memory structure initialization apparatus 10c, a memory verification apparatus 20c, and a memory updating apparatus 30c. The memory protection system 1c detects tampering with a memory and keeps data therein secret. In the memory protection system 1c, the memory structure initialization apparatus 10c receives, as an input, a plaintext of which tampering with is to be detected and which should be kept secret, and outputs a tree structure in an initial state and a memory address set for the nodes in the tree structure.

The memory verification apparatus 20c receives, as inputs, a place where a block(s) of a ciphertext of which tampering is to be checked is stored, a tree structure, and a memory address of each of the nodes in the tree structure, and verifies whether or not the memory has been tampered with. The memory updating apparatus 30c receives, as inputs, a place where a block of a ciphertext to be updated is stored, details of the update, a tree structure, and a memory address of each of the nodes in the tree structure.

The memory updating apparatus 30c outputs the updated tree structure or an error message indicating that tampering has been detected.

The memory protection system 1c according to the third example embodiment uses authenticated encryption (AE) as an elementary technology in addition to the MAC used in the memory protection system 1 according to the first example embodiment. The AE using the private key K is defined by two functions, i.e., an encryption function AE.Enc_K and a decryption function AE.Dec_K, which is a counterpart function of the function AE.Enc_K. The function AE.Enc_K uses a nonce N and a plaintext M as inputs, and outputs a ciphertext C and an authentication tag Tag. The encryption function is expressed by the below-shown Expression 40.

$$AE.Enc\_K(N,M)=(C,T) \quad \text{(Expression 40)}$$

The function AE.Enc_K uses, as three inputs, the nonce N, the ciphertext C, and the authentication tag, outputs a plaintext M which is the result of the decryption when no tampering has been detected, and outputs an error message ⊥ when tampering has been detected. These operations can be expressed by the below-shown Expression 41.

$$AE.Dec\_K(N,C,T)=M \text{ (when no tampering is detected)}$$

$$AE.Dec\_K(N,C,T)=\bot \text{ (when tampering is detected)} \quad \text{(Expression 41)}$$

[Description of Configuration of Memory Structure Initialization Apparatus]

The memory structure initialization apparatus 10c according to the third example embodiment includes a plaintext input unit 100, a memory address allocation unit 101, and a partially-updatable tag generation unit 102c. Further, the memory structure initialization apparatus 10c according to the third example embodiment includes a leaf node generation unit 103c, an intermediate node generation unit 104, a root node generation unit 105, a tree structure output unit 106, and a memory address output unit 107.

The plaintext input unit 100 is substantially the same as the plaintext input unit 100 in the memory structure initialization apparatus according to the first example embodiment, and therefore the description thereof will be omitted. The memory address allocation unit 101 is substantially the same as the memory address allocation unit 101 in the memory structure initialization apparatus will be omitted.

The partially-updatable tag generation unit 102c generates a tag for detecting tampering and a ciphertext by using a plaintext M output from the plaintext input unit 100, a memory address set Add output from the memory address allocation unit 101, and private keys K_1 and K_2. It is assumed that a MAC is used to generate tags for intermediate nodes and the root node, and authenticated encryption (AE) is used to encrypt a plaintext (a leaf node) and generate a tag thereof. Examples of the MAC algorithm include a PMAC, and examples of the AE algorithm include OCB (Offset CodeBook).

Firstly, the partially-updatable tag generation unit 102c generates data expressed by the below-shown Expression 42 as a ciphertext used in a leaf node and a tag thereof.

$$TagLeaf=(C[1],Tag(d,1),(C[2],Tag(d,2),\ldots,(C[2^d],Tag(d,2^d)))$$

$$(C[i],Tag(d,i))=AE.Enc\_\{K\_1\}(add(d,i)\|(0^\{CTR-1\}\|1),M[i])$$

$$1<=i<=2^d \quad \text{(Expression 42)}$$

Note that AE.Enc_{K_1} (·,·) represents the encryption function of the AE. Further, CTR represents a bit length of a local counter value stored in each node, and 0^{CTR−1} represents a bit string in which 0 is connected CTR−1 pieces. It is assumed that the value of CTR is determined in advance.

Next, the partially-updatable tag generation unit 102c generates data expressed by the below-shown Expression 43 as a tag used in an intermediate node.

$$TagInter=(Tag(1,1),\ldots,Tag(d-1,2^\{d-1\}))$$

$$Tag(1,1)=MAC\_K(add(1,1)\|(0^\{CTR-1\}\|1),(0^\{CTR-1\}\|1)\|(0^\{CTR-1\}\|1))$$

$$Tag(i,j\_i)=IncMAC\_K((1,\infty),(add(1,1)\|(0^\{CTR-1\}\|1),\infty),(add(i,j\_i)\|(0^\{CTR-1\}\|1),\infty),Tag(1,1))$$

$$1<=i<=d-1,1<=j\_i<=2^i,(i,j\_i)(1,1) \quad \text{(Expression 43)}$$

Next, the partially-updatable tag generation unit 102c generates data expressed by the below-shown Expression 44 as a tag used in the root node.

$$TagRoot=(Tag(0,1))$$

$$Tag(0,1)=IncMAC\_K((1,\infty),(add(1,1)\|(0^\{CTR-1\}\|1),\infty),(add(0,1)\|(0^\{CTR-1\}\|1),\infty),Tag(1,1)) \quad \text{(Expression 44)}$$

The leaf node generation unit 103c generates leaf nodes in the tree structure by using the ciphertext output from the partially-updatable tag generation unit 102c and a tag set TagLeaf. When $1<=i<=2^d$, an i-th leaf node is generated as shown by the below-shown Expression 45.

$$(ctr(d,i),C[i],Tag(d,i)) \quad \text{(Expression 45)}$$

Note that ctr(d, i) represents the counter value of an i-th leaf node at a depth d, and is incremented by one every time the node of interest is updated. Here, ctr(d, i) is defined as ctr(d, i)=0^{CTR−1}∥1 for all the index numbers i. Further, all the leaf nodes are expressed by the below-shown Expression 46.

$$Leaf=((ctr(d,1),C[1],Tag(d,1)),\ldots,(ctr(d,2^d),C[2^d],Tag(d,2^d))) \quad \text{(Expression 46)}$$

The intermediate node generation unit 104 is substantially the same as the intermediate node generation unit 104 in the memory structure initialization apparatus 10 according to the first example embodiment, and therefore the description thereof will be omitted. The root node generation unit 105 is substantially the same as the root node generation unit 105 in the memory structure initialization apparatus 10 according to the first example embodiment, and therefore the description thereof will be omitted. The tree structure output unit 106 is substantially the same as the tree structure output unit 106 in the memory structure initialization apparatus 10 according to the first example embodiment, and therefore the description thereof will be omitted. The memory address output unit 107 is substantially the same as the memory address output unit 107 in the memory structure initialization apparatus 10 according to the first example embodiment, and therefore the description thereof will be omitted.

[Description of Configuration of Memory Verification Apparatus]

The memory verification apparatus 20c according to the third example embodiment includes a tree structure input unit 200, a memory address input unit 201, a verification part input unit 202, a tag verification unit 203c, and a verification result output unit 204. The tree structure input unit 200 is substantially the same as the tree structure input unit 200 in the memory verification apparatus 20 according to the first example embodiment, and therefore the description thereof will be omitted. The memory address input unit 201 is substantially the same as the memory address input unit 201 in the memory verification apparatus 20 according to the first example embodiment, and therefore the description thereof will be omitted. The verification part input unit 202 is substantially the same as the verification part input unit 202 in the memory verification apparatus 20 according to the first example embodiment, and therefore the description thereof will be omitted.

The tag verification unit 203c verifies whether or not a part of the memory designated by the verification part CheckNode has been tampered with by using the tree structure Tree, the memory address set Add, the verification part CheckNode, and the private keys K_1 and K_2. Firstly, the tag verification unit 203c generates a path Path from the CheckNode-th leaf node to the root node. Note that the path Path indicates a root from the aforementioned leaf node to the root node, and is expressed by the below-shown Expression 47.

$$\text{Path}=(d,p\_d),(d-1,p\_\{d-1\}),(d-2,p\_\{d-2\}), \ldots ,(1,p\_1),(0,p\_0) \quad \text{(Expression 47)}$$

Note that when $1<=i<=d$, $1<=j\_i<=2^\{i\}$, each element (i, j_i) in the Path represents a j_i-th node at a depth i. Note that p_d=CheckNode, and for $0<=i<=d-1$, p_i is defined by the below-shown Expression 48.

$$p\_i=\text{ceiling}(p\_\{i+1\}/2) \quad \text{(Expression 48)}$$

Note that ceiling (·) represents a ceiling function. Further, the value of p_0 is always 1.

Next, the tag verification unit 203c calculates the below-shown Expression 49 by using the memory address set Add, which is the output from the memory address input unit 201, the tree structure Tree, which is the output from the tree structure input unit 200, and the private keys K_1 and K_2.

$$\text{AE.Dec}\_\{K\_1\}(add(d,p\_d)\|ctr(d,p\_d),C[p\_d],\text{Tag}(d,p\_d)) \quad \text{(Expression 49)}$$

When the result of the above-described calculation is an error message L, the tag verification unit 203c defines the verification result B as B=NCK, outputs the verification result B, and finishes the processes. Note that AE.Dec_{K_1} (·,·,·) is the decryption function of the method AE.Enc_{K_1} used in the partially-updatable tag generation unit 102c of the memory structure initialization apparatus 10c in the third example embodiment. Further, NCK indicates that information in a node related to the path has been tampered with.

On the other hand, when the result of the above-described calculation indicates that the ciphertext has been correctly decrypted as a plaintext M[p_d], the tag verification unit 203c calculates the below-shown Expression 50 subsequent to the above-described calculation.

$$\text{PathTag}'=(\text{Tag}'(d-1,p\_\{d-1\}), \ldots ,\text{Tag}'(0,p\_0)$$

$$\text{Tag}'(i,p\_i)=MAC\_\{K\_2\}(add(i,p\_i)\|ctr(i,p\_i),ctr(i+1,2p\_i-1)\|ctr(i+1,2p\_i))$$

$$0<=i<=d-1 \quad \text{(Expression 50)}$$

Note that MAC_{K_2} (·) is substantially the same as the MAC method used in the partially-updatable tag generation unit 102c of the memory structure initialization apparatus 10c according to the third example embodiment, and therefore the description thereof will be omitted.

Further, the tag verification unit 203c also acquires a value expressed by the below-shown Expression 51 from the tree structure Tree, which is the output from the tree structure input unit 200.

$$\text{PathTag}=(\text{Tag}(d-1,p\_\{d-1\}), \ldots ,\text{Tag}(0,p\_0) \quad \text{(Expression 51)}$$

Then, the tag verification unit 203c checks whether or not the PathTag' calculated by the tag verification unit 203c itself is equal to the PathTag acquired from the tree structure Tree. For $0<=i<=d-1$, when the equation Tag'(i, p_i)=Tag(i, p_i) holds for all the index numbers i, the tag verification unit 203c sets ACK as the verification result. The ACK indicates that information in the nodes related to the path has not been tampered with. The verification result is represented by B, and the fact that the verification result is ACK is expressed as B=ACK.

On the other hand, for $0<=i<=d$, when the relation Tag'(i, p_i)≠Tag(i, p_i) holds for at least one of the index numbers i, the tag verification unit 203 defines the verification result B as B=NCK.

The tag verification unit 203 outputs the verification result B.

The verification result output unit 204 is substantially the same as the verification result output unit 204 in the memory verification apparatus 20 according to the first example embodiment, and therefore the description thereof will be omitted.

[Description of Configuration of Memory Updating Apparatus]

The memory updating apparatus 30c according to the third example embodiment includes a tree structure input unit 300, a memory address input unit 301, an update part input unit 302, a memory verification unit 303c, a counter updating unit 304, a partially-updatable tag updating unit 305c, and an update result output unit 306. The tree structure input unit 300 is substantially the same as the tree structure input unit 300 in the memory updating apparatus 30 will be omitted. The memory address input unit 301 is substantially the same as the memory address input unit 301 in the memory updating apparatus 30 according to the first example embodiment, and therefore the description thereof will be omitted. The update part input unit 302 is substantially the same as the update part input unit 302 in the memory updating apparatus 30 according to the first example embodiment, and therefore the description thereof will be omitted.

The memory verification unit 303c verifies whether or not a part of the memory designated by the UpdateNode has been tampered with by using the tree structure Tree, the memory address set Add, the update information UpdateNode for the memory, and the private keys K_1 and K_2. The process performed by the memory verification unit 303c is the same as the process performed by the tag verification unit 203c in the memory verification apparatus 20c according to the third example embodiment, but only the output result is different. While the tag verification unit 203c in the memory verification apparatus 20c according to the third example embodiment outputs the verification result B, the memory verification unit 303c outputs, together with the verification result B, the path Path from the node of interest to the root node. The memory verification unit 303c outputs the verification result B to the counter updating unit 304, the partially-updatable tag updating unit 305c, and the update result output unit 306. Further, the memory verification unit 303c outputs the path Path to the counter updating unit 304 and the partially-updatable tag updating unit 305c.

The counter updating unit 304 is substantially the same as the counter updating unit 304 in the memory updating apparatus 30 according to the first example embodiment, and therefore the description thereof will be omitted.

The partially-updatable tag updating unit 305c updates the tag of the node designated by the Path by using the updated tree structure NewTree', the memory address set Add, the update information UpdateNode for the memory, the verification result B, the path Path, and the private keys K_1 and K_2. When B=ACK, the partially-updatable tag updating unit 305c calculates the below-shown Expression 52 for 0<=i<=d−1.

$$(C[p\_d], Tag(d,p\_d)) \leftarrow AE.Enc\_\{K\_1\}(add(d,p\_d)\|ctr(d,p\_d), UpdateInfo)$$

$$Tag(i,p\_i) \leftarrow IncMAC\_\{K\_2\}((1,ind\_\{i+1\}),((add(i,p\_i)\|(ctr(i,p\_i)-1)), ctr(i+1,p\_\{i+1\})-1),((add(i,p\_i)\|ctr(i,p\_i)), ctr(i+1,p\_\{i+1\})), Tag(i,p\_i))$$

$$ind\_\{i+1\}=((p\_\{i+1\}-1) \bmod 2)+1 \quad \text{(Expression 52)}$$

Note that AE.Enc_{K_1}(·,·), MAC_{K_2}(·), and IncMAC_{K_2} are substantially the same as the methods used in the partially-updatable tag generation unit 102c of the memory structure initialization apparatus 10c and the tag verification unit 203c of the memory verification apparatus 20c in the third example embodiment, and therefore the description thereof will be omitted. Further, ind_{i+1} is a value indicating what number child node the node (i+1, p_{i+1}) is relative to its parent node (i, p_i). Then, the partially-updatable tag updating unit 305c outputs the updated tree structure NewTree. On the other hand, when B=NCK, the partially-updatable tag updating unit 305c does not perform the process and does not output anything.

The update result output unit 306 is substantially the same as the update result output unit 306 in the memory updating apparatus 30 according to the first example embodiment, and therefore the description thereof will be omitted.

Description of Effect

The effects provided by the third example embodiment include, in addition to those provided by the first example embodiment, an effect that it is possible to keep data in the memory secret. In the partially-updatable tag generation unit 102 of the memory structure initialization apparatus 10, the tag verification unit 203 of the memory verification apparatus 20, and the partially-updatable tag updating unit 305 of the memory updating apparatus 30 according to the first example embodiment, a MAC is used to detect tampering with a plaintext message. In contrast to this, in the third example embodiment, it is possible, in addition to being able to detect tampering, to keep the plaintext message secret by performing an AE process on the plaintext message. It is assumed that, for the used AE, it is possible to adopt a rate−1 method such as OCB, i.e., a method having such a property that the encryption of a plaintext and the generation of an authentication tag can be implemented at the cost for only the encryption, and the amount of data of the plaintext and that of the ciphertext are equal to each other. In this case, the amount of data for the whole tree structure and the amount of calculation required in each apparatus are roughly equal to those in the first example embodiment. That is, in the third example embodiment, it is possible to keep data secret as well as to detect tampering by the amount of data and the amount of calculation equivalent to those in the first example embodiment. Further, although it is assumed that the tree structure in the third example embodiment is a binary tree, needless to say, it is possible to use a tree structure having three or more branches (i.e., each node has three or more branches). As described in the second example embodiment, the larger the number of branches in the tree structure is, the more the effect that is obtained by using Incremental MAC becomes prominent.

Fourth Example Embodiment

Next, a fourth example embodiment will be described. The following description and drawings are partially omitted and simplified as appropriate for clarifying the explanation. Further, the same reference numerals (or symbols) are assigned to the same components/structures throughout the drawings, and redundant descriptions thereof are omitted as appropriate. Therefore, in the following description, parts different from those in the above-described first example embodiment will be mainly described. In the fourth example embodiment, an example of a memory protection system in which the MAC and AE, which are also used in the third example embodiment, are methods using 128-bit input/output block cipher, and both of them have 64-bit security will be described. Note that, similarly to the third example embodiment, it is defined that the number of branches of a tree structure constructed by a memory protection system 1d is two and a depth thereof is d.

Figure 13:
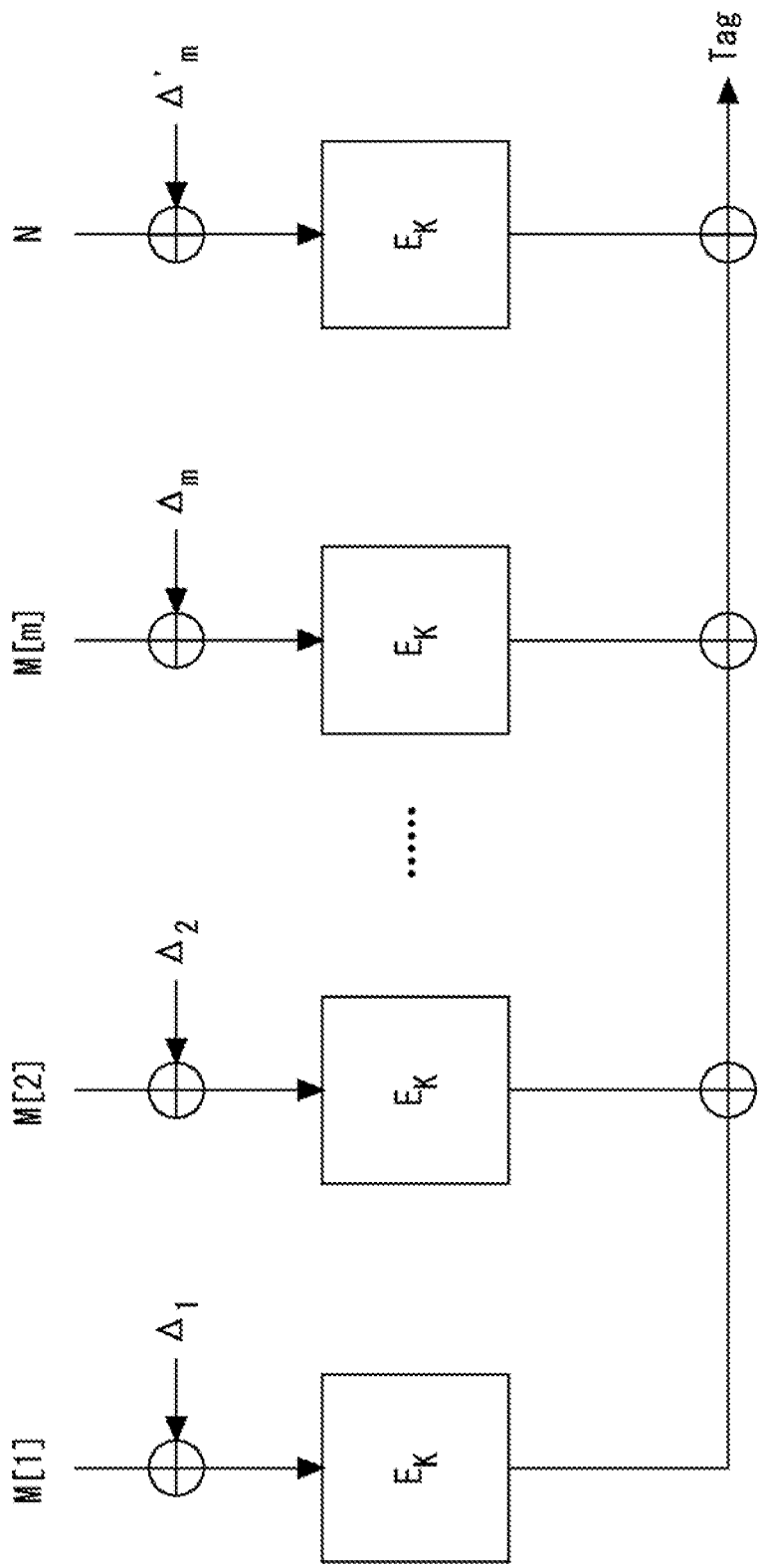
FIG. 13 schematically shows calculation of a MAC used in a memory protection system according to a fourth example embodiment.

FIG. 13 schematically shows calculation of a MAC used in a memory protection system according to the fourth example embodiment. The MAC shown in FIG. 13 is defined as follows. A private key is represented by K; a nonce is represented by N; a plaintext is defined as M=M[1]|| . . . ||M[m−1]||M[m]; and 128-bit block cipher using the private key K is represented by E_K. The 128-bit input/output block cipher is implemented by, for example, an AES. Note that the nonce has 128 bits, and M[i] has 128 bits for 1<=i<=m.

By the MAC used in the fourth example embodiment, an authentication tag Tag is derived as shown by the below-shown Expression 53.

$$Tag=E\_K(M[1]+\Delta\_1)+E\_K(M[2]+\Delta\_2)+ \ldots +E\_K(M[m]+\Delta\_m)+E\_K(N+\Delta'\_m) \quad \text{(Expression 53)}$$

Note that mask values Δ_1, Δ_2, . . . , Δ_m, and Δ'_m are defined by, for example, the below-shown Expression 54.

$$\Delta\_1=L=2 \cdot E\_K(0^\{128\})$$

$$\Delta\_i=\Delta\_\{i-1\}+L[ntz(i)] (2<=i<=m)$$

$$\Delta'm=\Delta\_m+E\_K(0^\{128\}) \quad \text{(Expression 54)}$$

Note that ntz(i) stands for number of training zero, and is defined as the number of consecutive zeros from the least significant bit when a decima number i is converted into a binary number. For example, in the case of ntz(7), ntz(7)=0 because 7 is expressed as "111" in binary. Similarly, ntz(8)=3. Further, L[j] is defined as calculation of L·2^j on a finite field GF (2^n). Further, + is an exclusive OR (XOR), and 0^{128} is a bit string in which 0 is connected 128 pieces. The MAC defined as described above has 64-bit security, and also has an Incremental property.

That is, the message authentication code (MAC) according to the fourth example embodiment has the following features. Each of blocks of a plaintext to be verified, obtained by dividing the plaintext is encrypted by an encryption method in which, for an input of a block cipher, the exclusive OR of masks each of which is derived from a nonce, a private key, and a constant, which varies for each of the blocks, is obtained (or calculated). Then, an authentication tag is generated by obtaining (or calculating) the exclusive OR of results of the encryption of the blocks of the plaintext.

Figure 14:
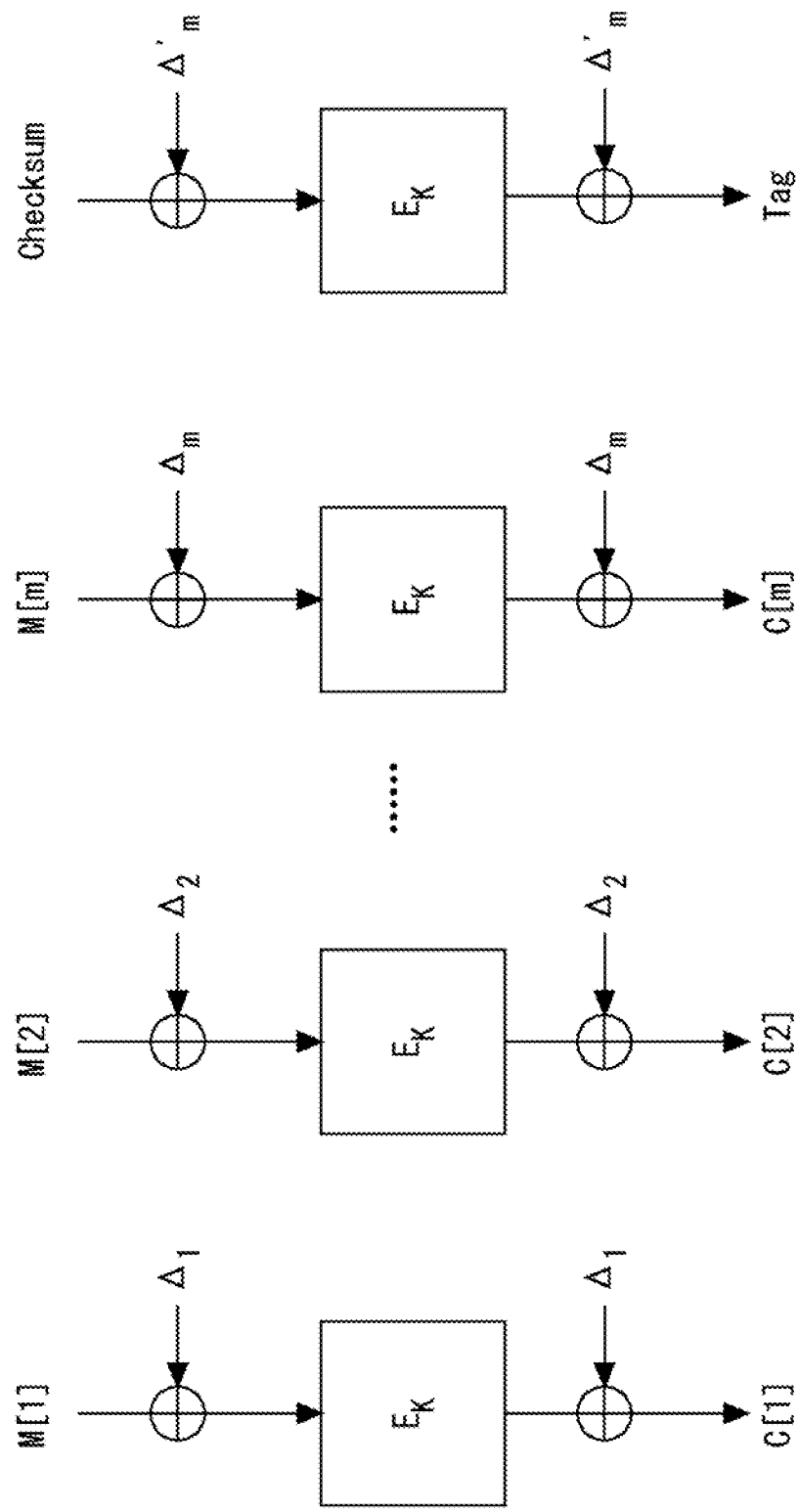
FIG. 14 schematically shows calculation of an AE used in the memory protection system according to the fourth example embodiment.

FIG. 14 schematically shows calculation of an AE used in the memory protection system according to the fourth example embodiment. The AE shown in FIG. 14 is defined as follows. A private key is represented by K; a nonce is represented by N; a plaintext is defined as M=M[1]|| . . . || M[m−1]||M[m]; and 128-bit block cipher using the private key K is represented by E_K. Note that the nonce has 128 bits, and M[i] has 128 bits for 1<=i<=m.

By the AE used in the fourth example embodiment, a ciphertext C and an authentication tag Tag are derived by the below-shown Expression 55.

$$C[i]=E\_K(M[i]+\Delta\_i)+\Delta\_i(1<=i<=m)$$

$$C=C[1]\|C[2]\| \ldots \|C[m]$$

$$\text{Checksum}=M[1]+M[2]+ \ldots +M[m]$$

$$Tag=E\_K(\text{Checksum}+\Delta'\_m)+\Delta'\_m \quad \text{(Expression 55)}$$

Note that mask values $\Delta\_1, \Delta\_2, \ldots, \Delta\_m$, and $\Delta'\_m$ are defined by, for example, the below-shown Expression 56.

$$L=2\cdot E\_K(0^\wedge\{128\})$$

$$\Delta\_1=E\_K(N)+L$$

$$\Delta\_i=\Delta\_\{i-1\}+L[ntz(i)](2<=i<=m)$$

$$\Delta'\_m=\Delta\_m+E\_K(0^\wedge\{128\}) \quad \text{(Expression 56)}$$

The AE defined as described above has 64-bit security. Further, the AE defined as described above achieves a rate of 1. That is, it is possible to implement encryption and detection of tampering at the cost for only the encryption.

That is, the authenticated encryption (AE) according to the fourth example embodiment has the following features. A ciphertext is generated by encrypting each of blocks of a plaintext to be verified, obtained by dividing the plaintext by an encryption method in which, for an input and an output of block cipher, the exclusive OR of masks each of which is derived from a nonce, a private key, and a constant, which varies for each of the blocks, is obtained (or calculated). Then, an authentication tag is generated by calculating a checksum of the plaintext by using the blocks of the plaintext, and encrypting the checksum by an encryption method in which, for an input and an output of block cipher, the exclusive OR of masks each of which is derived from a nonce, a private key, and a constant, which varies for each of the blocks, is obtained (or calculated).

The memory protection system 1c according to the fourth example embodiment is substantially the same as the memory protection system 1c according to the third example embodiment, and therefore the description thereof will be omitted. However, it is assumed that the MAC and AE used as elementary technologies are those described above.

Description of Effect

The effects provided by the fourth example embodiment are substantially the same as those provided by the third example embodiment. However, in the fourth example embodiment, owing to the natures of the used MAC and AE, the following effects are obtained. Firstly, owing to the security level of the MAC and AE, the memory protection system 1d according to the fourth example embodiment may have 64-bit security. In addition, by using a method in which, for the AE, the rate is 1, and the amount of data of the plaintext and that of the ciphertext are equal to each other, it is possible to keep the plaintext secret without substantially changing the amount of data for the whole tree structure and the amount of calculation required in each apparatus from those in the first example embodiment. Further, in the fourth example embodiment, since the same primitive (e.g., the AES or the like) may be used in the MAC and in the AE, the scale (e.g., the size) of the circuit can be reduced in the actual implementation.

Fifth Example Embodiment

Next, a fifth example embodiment will be described. The following description and drawings are partially omitted and simplified as appropriate for clarifying the explanation. Further, the same reference numerals (or symbols) are assigned to the same components/structures throughout the drawings, and redundant descriptions thereof are omitted as appropriate. In the fifth example embodiment, an example of a memory protection system in which the MAC and AE, which are also used in the third example embodiment, are method using 128-bit input/output Tweakable block cipher, and both of them have 128-bit security will be described. Note that, similarly to the third example embodiment, it is defined that the number of branches of a tree structure constructed by the memory protection system is two and a depth thereof is d.

Firstly, Tweakable block cipher (TBC: Tweakable Block Cipher) is defined. The TBC is an extended version of the block cipher, and is a substitution, using a key, in which a public adjustment value called a Tweak is included in the input of the block cipher. Each TBC using a different Tweak can be considered to be independent block cipher. TBC having an input/output length of n bits and a Tweak length of tw bits is represented by TE. Note that when a ciphertext C can obtained by encrypting a plaintext M by the TE by using a private key K and a Tweak Tw, the ciphertext C can be expressed by the below-shown Expression 57.

$$TE\_K(Tw,M)=C \quad \text{(Expression 57)}$$

Note that n is equal to 128 in the fifth example embodiment. Although the Tweak length tw is not limited to any particular length, it is defined that the Tweak length is 128 bits or longer. Further, when it is desired that a Tweak having a bit length longer than the Tweak length be input, the Tweak is processed by an appropriate method so that the desired security is not impaired. For example, examples of the appropriate method include Tweak extension method such as XT and XTX.

Figure 15:
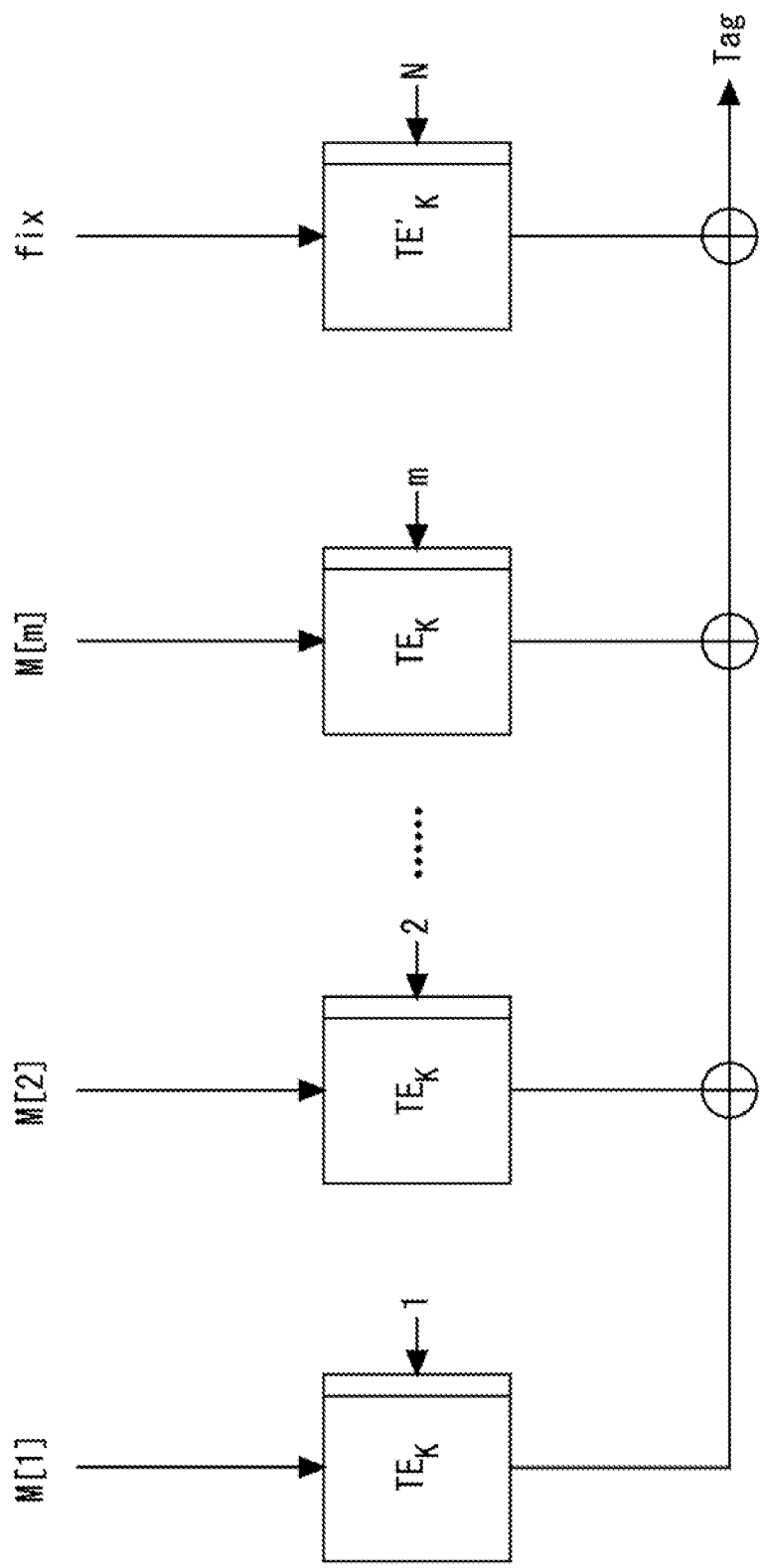
FIG. 15 schematically shows calculation of a MAC used in a memory protection system according to a fifth example embodiment.

FIG. 15 schematically shows calculation of a MAC used in a memory protection system according to the fifth example embodiment. The MAC shown in FIG. 15 is defined as follows. A private key is represented by K; a nonce is represented by N; a plaintext is defined as M=M[1]|| . . . || M[m−1]||M[m]; and 128-bit input/output TBC using the private key K is represented by TE_K. TBC having 128-bit input/output and a Tweak length of 128 bits is implemented by, for example, SKINNY. Note that the nonce has 128 bits, and M[i] has 128 bits for 1<=i<=m.

By the MAC used in the fifth example embodiment, an authentication tag Tag is derived as shown by the below-shown Expression 58.

$$Tag=TE\_K(1,M[1])+TE\_K(2,M[2]) \ldots +TE\ K(m,M[m])+TE\_K(N,fix) \quad \text{(Expression 58)}$$

Note that + is an exclusive OR. Further, fix is an appropriate fixed value, and is, for example, $0^\wedge n$. Further, TE' is a TBC that is implemented by appropriately using Tweaks different from those of the TE. For example, in the TE used in the plaintext part, 0 is always set in the most significant bit of the Tweak, and in the TE' used in the nonce part, 1 is always set in the most significant bit of the Tweak. Further, when there is a remaining part (i.e., an unused part) in the Tweak input in the part of the plaintext to be processed, another plaintext may be further input in the remaining part of the Tweak input. In this way, the efficiency of the MAC can be improved even further. The MAC defined as described above has 128-bit security, and also has an Incremental property.

That is, the message authentication code (MAC) according to the fifth example embodiment has the following features. Each of blocks of a plaintext to be verified, obtained by dividing the plaintext is encrypted by an encryption method in which a constant, which varies for each of the blocks, is input into the Tweak part of the Tweakable block cipher. Then, an authentication tag is generated by performing encryption by an encryption method in which a nonce is input into the Tweak part of the Tweakable block cipher, and obtaining (or calculating) the exclusive OR of results of the encryption of the blocks of the plaintext and the result of the encryption of the nonce.

Figure 16:
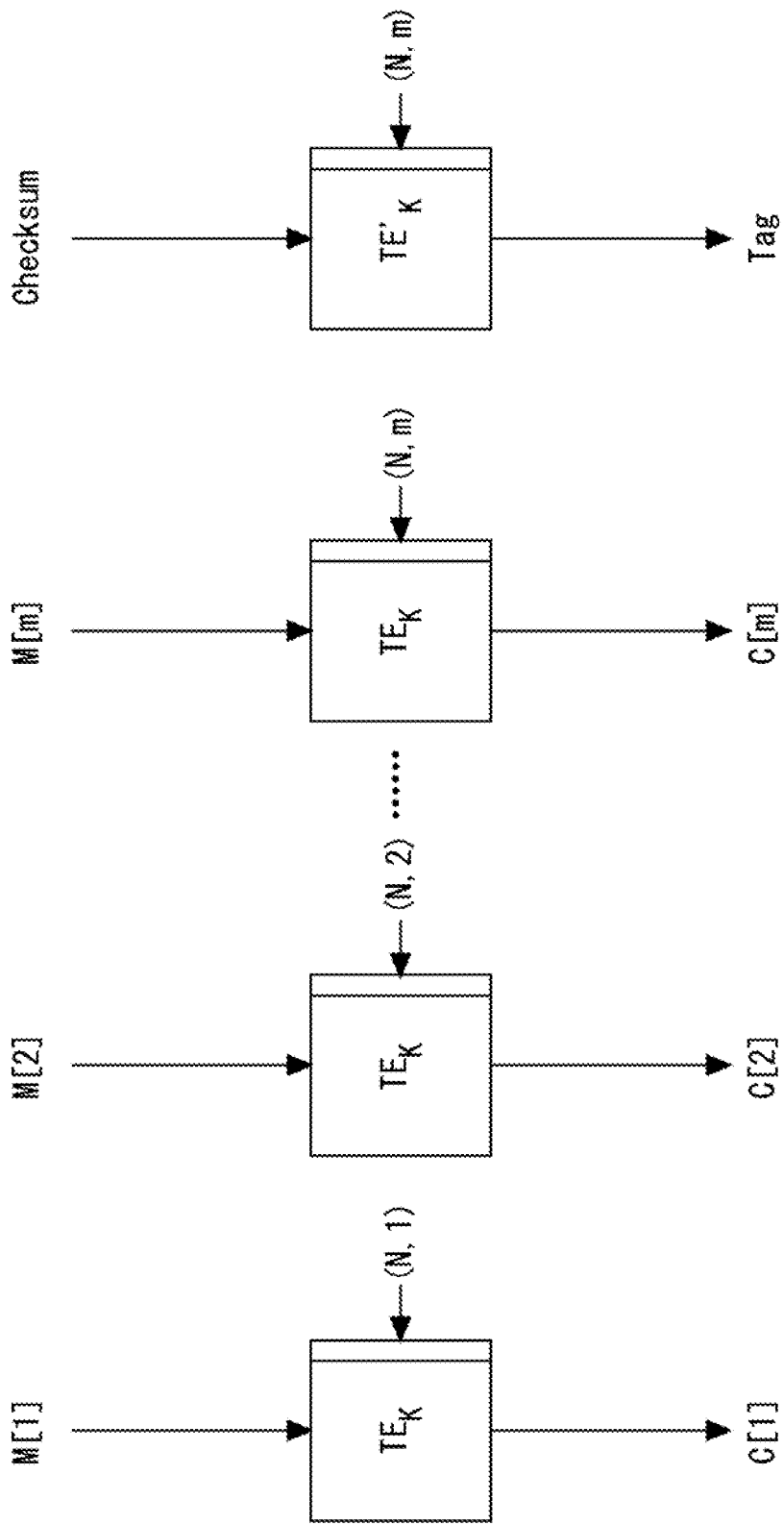
FIG. 16 schematically shows calculation of an AE used in the memory protection system according to the fifth example embodiment.

FIG. 16 schematically shows calculation of an AE used in the memory protection system according to the fifth example embodiment. The AE shown in FIG. 16 is defined as follows. A private key is represented by K; a nonce is represented by N; a plaintext is defined as $M=M[1]\| \ldots \|M[m-1]\|M[m]$; and 128-bit input/output TBC using the private key K is represented by TE_K. Note that the nonce has 128 bits, and $M[i]$ has 128 bits for $1<=i<=m$. By the AE used in the fifth example embodiment, a ciphertext C and an authentication tag Tag are derived as shown by the below-shown Expression 59.

$C[i]=TE\_K((N,i),M[i])(1<=i<=m)$ $C=C[1]\|C[2]\| \ldots \|C[m]$

Checksum$=M[1]+M[2]+ \ldots +M[m]$

Tag$=TE'\_K((N,m),$Checksum$)$ (Expression 59)

Note that the input (N, i) to the Tweak part of TE_K indicates that both N and i are appropriately input to the Tweak part. For example, the input (N, i) may be input in such a manner that the Tweak input part is divided into a part where the nonce N is input and a part where the block index i is input. Further, similarly to the TE' in the MAC used in the fifth example embodiment, TE' is a TBC that is implemented by appropriately using Tweaks different from those of the TE. The AE defined as described above has 128-bit security. Further, the AE defined as described above achieves a rate of 1. That is, it is possible to implement encryption and detection of tampering at the cost for only the encryption.

Note that the memory protection system 1c according to the fifth example embodiment is substantially the same as the memory protection system 1c according to the third example embodiment, and therefore the description thereof will be omitted. However, it is assumed that the MAC and AE used as elementary technologies are those described above.

Description of Effect

The effects provided by the fifth example embodiment are substantially the same as those provided by the fourth example embodiment. However, while the memory protection system according to the fourth example embodiment has 64-bit security, the memory protection system according to the fifth example embodiment has 128-bit security, so that the fifth example embodiment has higher security.

Sixth Example Embodiment

Next, a sixth example embodiment will be described.

Figure 17:
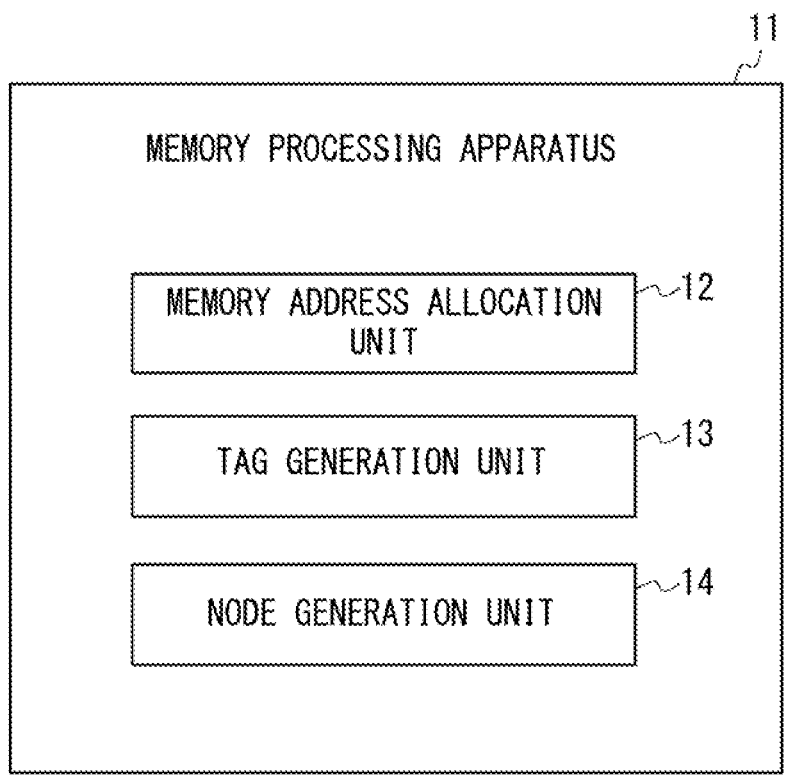
FIG. 17 shows a configuration of a memory processing apparatus according to a sixth example embodiment.

FIG. 17 shows a configuration of a memory processing apparatus 11 according to the sixth example embodiment. The memory processing apparatus 11 according to the sixth example embodiment corresponds to the above-described memory structure initialization apparatus 10. The memory processing apparatus 11 includes a memory address allocation unit 12, a tag generation unit 13, and a node generation unit 14. The memory address allocation unit 12 has a function as memory address allocation means. The tag generation unit 13 has a function as tag generation means. The node generation unit 14 has a function as node generation means.

The memory address allocation unit 12 can be implemented by substantially the same function as that of the above-described memory address allocation unit 101. The tag generation unit 13 can be implemented by substantially the same function as that of the above-described partially-updatable tag generation unit 102. The node generation unit 14 can be implemented by substantially the same function as those of the above-described leaf node generation unit 103, the intermediate node generation unit 104, and the root node generation unit 105.

The memory address allocation unit 12 allocates, to each of nodes in a tree structure configured to protect a memory, a memory address unique to the node. The tag generation unit 13 defines, for each of the nodes in the tree structure, a connection of the memory address of the node and a constant as a nonce, and generates a tag by inputting the nonce and a plaintext of which tampering with is to be detected, or the nonce and constants of a plurality of child nodes of each of the nodes into a message authentication code. Note that the message authentication code is a code by which a partially-updatable tag can be output. Further the tag generation unit 13 generate, for each of nodes other than the leaf nodes and the specific node, a tag by inputting the nonce, the nonce of the specific node, and the tag of the specific node into the message authentication code, which is the code by which a partially-updatable tag can be output. The node generation unit 14 generate each of the nodes in the tree structure by using the constant as a local counter and combining at least the tag and the local counter. By the above-described configuration, the memory processing apparatus 11 can reduce the amount of processing required for writing to the memory in the configuration in which the tree structure is used for protecting the memory.

(Example of Hardware Configuration)

An example of a configuration of hardware resources for implementing an apparatus and a system according to each of the above-described example embodiments by using one calculation processing apparatus (an information processing apparatus or a computer) will be described. However, the apparatus according to each example embodiment (the memory processing apparatus, the memory verification apparatus, the memory updating apparatus) may be implemented by using at least two physically or functionally separated calculation processing apparatuses. Further, the apparatus according to each example embodiment may be implemented as a dedicated apparatus or may be implemented by a general-purpose information processing apparatus.

Figure 18:
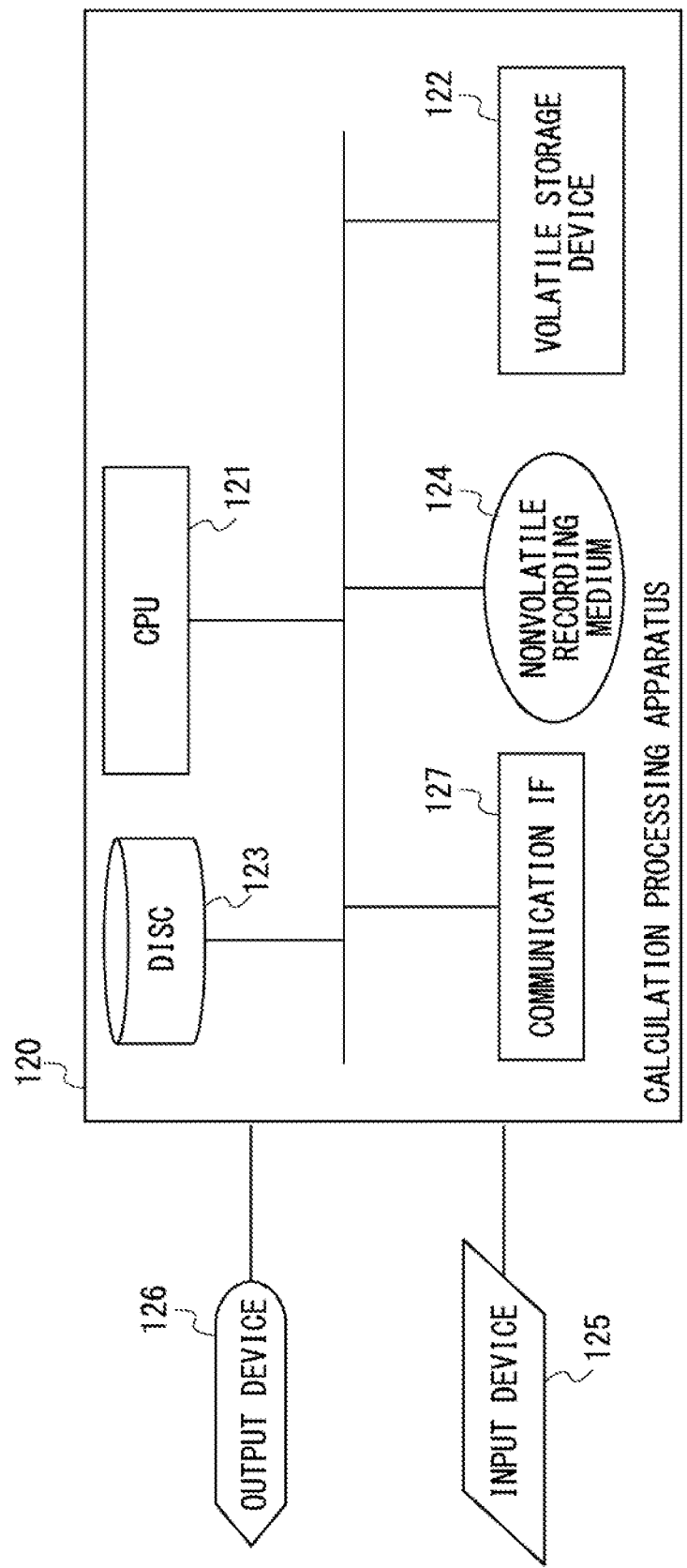
FIG. 18 schematically shows an example of a hardware configuration of a calculation processing apparatus capable of implementing an apparatus and a system according to each example embodiment.

FIG. 18 is a block diagram schematically showing an example of a hardware configuration of a calculation processing apparatus capable of implementing an apparatus and a system according to each example embodiment. The calculation processing apparatus 120 includes a CPU 121, a volatile storage device 122, a disc 123, a nonvolatile recording medium 124, and a communication IF (IF: Interface) 127. Therefore, the apparatus according to each example embodiment includes the CPU 121, the volatile storage device 122, the disc 123, the nonvolatile recording medium 124, and the communication IF 127. The calculation processing apparatus 120 may be configured so that an input device 125 and an output device 126 can be connected thereto. The calculation processing apparatus 120 may include the input device 125 and the output device 126. Further, the calculation processing apparatus 120 can transmit and receive information to and from other calculation processing apparatuses and communication apparatuses through the communication IF 127.

The nonvolatile recording medium 124 is, for example, a computer readable Compact Disc or a computer readable Digital Versatile Disc. Further, the nonvolatile recording medium 124 may be a USB (Universal Serial Bus) memory, a Solid State Drive, or the like. The nonvolatile recording medium 124 holds (i.e., retains) a relevant program(s) even when no electric power is supplied, thus enabling the program(s) to be carried and transported. Note that the nonvolatile recording medium 124 is not limited to the above-described media. Alternatively, instead of using the nonvolatile recording medium 124, the relevant program(s) may be supplied through the communication IF 127 and a communication network(s).

The volatile storage device 122 can be read by a computer, and can temporarily store data. The volatile storage device 122 is a memory or the like such as a DRAM (dynamic random access memory) or an SRAM (static random access memory).

That is, the CPU 121 copies (i.e., loads) a software program (a computer program: hereinafter also simply referred to as a "program") stored in the disc 123 into the volatile storage device 122 when it executes the program, and thereby performs arithmetic processing. The CPU 121 reads data necessary for executing the program from the volatile storage device 122. When it is necessary to display an output result, the CPU 121 displays the output result on the output device 126. When a program is input from the outside, the CPU 121 acquires the program through the input device 125. The CPU 121 interprets and executes programs corresponding to the above-described functions (the processes) of the respective components shown in FIGS. 1 to 4, and FIG. 17. The CPU 121 performs the processes described in each of the above-described example embodiments. In other words, the above-described functions of the respective components shown in FIGS. 1 to 4, and FIG. 17 can be implemented by having the CPU 121 execute a program(s) stored in the disc 123 or the volatile storage device 122.

That is, it can be considered that each example embodiment can be accomplished by the above-described program. Further, it can be considered that each of the above-described example embodiments can also be accomplished by a nonvolatile recording medium which can be read by a computer and in which the above-described program is recorded.

Modified Example

Note that the present invention is not limited to the above-described example embodiments, and they may be modified as appropriate without departing from the scope and spirit of the invention. For example, in the above-described flowcharts, the order of processes (steps) can be changed as appropriate. Further, at least one of a plurality of processes (steps) may be omitted (or skipped).

In the above-described examples, the program can be stored and provided to a computer using any type of non-transitory computer readable media. Non-transitory computer readable media include any type of tangible storage media. Examples of non-transitory computer readable media include magnetic storage media (floppy disks, magnetic tapes, hard disk drives), optical magnetic storage media (e.g., magneto-optical disks), CD-ROM, CD-R, CD-R/W, and semiconductor memories (e.g., mask ROM, PROM (Programmable ROM), EPROM (Erasable PROM), flash ROM, and RAM). Further, the program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Although the present invention is described above with reference to example embodiments, the present invention is not limited to the above-described example embodiments. Various modifications that can be understood by those skilled in the art can be made to the configuration and details of the present invention within the scope of the invention.

The whole or part of the example embodiments disclosed above can be described as, but not limited to, the following supplementary notes.

Supplementary Note 1

A memory processing apparatus comprising:
memory address allocation means for allocating, to each of nodes in a tree structure configured to protect a memory, a memory address unique to the node;
tag generation means for defining, for each of the nodes in the tree structure, a connection of the memory address and a constant as a nonce, generating, for each of leaf nodes and a specific node, a tag by inputting the nonce and a plaintext of which tampering with is to be detected, or the nonce and constants of a plurality of child nodes of each of the nodes into a message authentication code, and generating, for each of nodes other than the leaf nodes and the specific node, a tag by inputting the nonce, the nonce of the specific node, and the tag of the specific node into the message authentication code, the message authentication code being a code by which a partially-updatable tag can be output; and
node generation means for generating each of the nodes in the tree structure by using the constant as a local counter and combining at least the tag and the local counter.

Supplementary Note 2

The memory processing apparatus described in Supplementary note 1, wherein the node generation means comprises:

leaf node generation means for generating a leaf node in the tree structure by combining the plaintext, the tag, and the local counter;

intermediate node generation means for generating an intermediate node in the tree structure by combining the tag and the local counter; and root node generation means for generating a root node in the tree structure by combining the tag and the local counter.

Supplementary Note 3

The memory processing apparatus described in Supplementary note 2, wherein the tag generation means generates a ciphertext to be verified and the tag by inputting the nonce and the constants of the plurality of child nodes into the message authentication code, which is the code by which the partially-updatable tag can be output, and inputting the nonce and the plaintext into an authenticated encryption, and the leaf node generation means generates the leaf node by combining the ciphertext, the tag, and the local counter.

Supplementary Note 4

The memory processing apparatus described in Supplementary note 3, wherein the message authentication code, which is the code by which the partially-updatable tag can be output, is a message authentication code by which a partially-updatable tag can be output, and by which each of blocks of a plaintext to be verified, obtained by dividing the plaintext is encrypted by an encryption method in which, for an input of a block cipher, an exclusive OR of masks, each of which is derived from a nonce, a private key, and a constant which varies for each of the blocks, is obtained, and an authentication tag is generated by obtaining an exclusive OR of results of the encryption of the blocks of the plaintext, and the authenticated encryption is authenticated encryption by which a ciphertext is generated by encrypting each of blocks of a plaintext to be encrypted, obtained by dividing the plaintext by an encryption method in which, for an input and an output of block cipher, an exclusive OR of masks, each of which is derived from the nonce, the private key, and the constant which varies for each of the blocks, is obtained, and by which an authentication tag is generated by calculating a checksum of the plaintext by using the blocks of the plaintext, and encrypting the checksum by an encryption method in which, for the input and the output of the block cipher, an exclusive OR of masks, each of which is derived from the nonce, the private key, and the constant which varies for each of the blocks, is obtained.

Supplementary Note 5

The memory processing apparatus described in Supplementary note 3, wherein the message authentication code, which is the code by which the partially-updatable tag can be output, is a message authentication code by which a partially-updatable tag can be output, and by which each of blocks of a plaintext to be verified, obtained by dividing the plaintext is encrypted by an encryption method in which a constant, which varies for each of the blocks, is input to a Tweak part of Tweakable block cipher, and is encrypted by an encryption method in which a nonce is input to the Tweak part of the Tweakable block cipher, and an authentication tag is generated by obtaining an exclusive OR of results of the encryption of the blocks of the plaintext and a result of the encryption of the nonce, and the authenticated encryption is authenticated encryption by which a ciphertext is generated by encrypting each of blocks of a plaintext to be encrypted, obtained by dividing the plaintext by an encryption method in which a nonce and a constant, which varies for each of the blocks, are input to the Tweak part of the Tweakable block cipher, and by which an authentication tag is generated by calculating a checksum of the plaintext by using the blocks of the plaintext, and encrypting the checksum by an encryption method in which the nonce and the constant, which varies for each of the blocks, are input to the Tweak part of the Tweakable block cipher.

Supplementary Note 6

A memory verification apparatus comprising:

input means for inputting a tree structure configured to protect a memory and a memory address allocated to the tree structure; and tag verification means for verifying whether or not a plaintext to be verified has been tampered with by generating a path from a leaf node containing the plaintext to a root node, defining, for each of nodes in the path, a connection of the memory address unique to the node and a local counter stored in the node as a nonce, and generating a tag used for a verification by inputting the nonce and the plaintext, or the nonce and the local counters of a plurality of child nodes of each of the nodes into a message authentication code, the message authentication code being a code by which a partially-updatable tag can be output.

Supplementary Note 7

The memory verification apparatus described in Supplementary note 6, wherein the tag verification means verifies whether or not a ciphertext to be verified has been tampered with by generating, in the tree structure, a path from a leaf node containing the ciphertext to the root node, defining, for each of nodes in the path, a connection of a memory address unique to the node and a local counter stored in the node as a nonce, inputting the nonce and local counters of a plurality of child nodes of each of the nodes into the message authentication code, which is the code by which the partially-updatable tag can be output, and thereby generating a tag used for a verification, and inputting the nonce, the ciphertext, and the tag used for the verification into the authenticated encryption, and thereby verifying whether or not the plaintext has been tampered with.

Supplementary Note 8

A memory updating apparatus comprising:

input means for inputting a tree structure configured to protect a memory and a memory address allocated to the tree structure;

memory verification means for verifying whether or not a plaintext to be verified has been tampered with by generating a path from a leaf node containing the plaintext to a root node, defining, for each of nodes in the path, a connection of the memory address unique to the node and a local counter stored in the node as a nonce, and generating a tag used for a verification by inputting the nonce and the plaintext, or the nonce and the local counters of a plurality of child nodes of each of the nodes into a message authentication code, and then outputting a result of the verification and the path, the message authentication code being a code by which a partially-updatable tag can be output;

counter updating means for, when the result of the verification indicates that no tampering is detected, updating a value of the local counter in each of the nodes in the path; and tag generation means for, when the result of the verification indicates that no tampering is detected, defining a connection of the memory address unique to each of the nodes in the path and the local counter stored in each of the nodes as a nonce, generating a tag used for an update by inputting the nonce and the plaintext, or the nonce, the local counter of at least one child node of each of the nodes, the nonce before the update, and the local counter of at least one child node of each of the nodes before the update into the message authentication code, and updating a value of a tag stored in each of the nodes in the path with the tag used in the update, the message authentication code being the code by which the partially-updatable tag can be output.

Supplementary Note 9

The memory updating apparatus described in Supplementary note 8, wherein the memory verification means verifies whether or not a ciphertext to be updated has been tampered with by generating, in the tree structure, a path from a leaf node containing the ciphertext to the root node, defining, for each of nodes in the path, a connection of a memory address unique to the node and a local counter stored in the node as a nonce, inputting the nonce and local counters of a plurality of child nodes of each of the nodes into the message authentication code, which is the code by which the partially-updatable tag can be output, and thereby generating a tag used for a verification, and inputting the nonce, the ciphertext, and the tag used for the verification into the authenticated encryption, and thereby verifying whether or not the plaintext has been tampered with, and thereby outputs a result of the verification and the path, and when the result of the verification indicates that no tampering has been detected, the tag updating means defines a connection of the memory address unique to each of the nodes and a local counter stored in each of the nodes as a nonce, inputs the nonce, the local counter of at least one child node of each of the nodes, the nonce before the update, and the local counter of at least one child node of each of the nodes before the update into the message authentication code, which is the code by which the partially-updatable tag can be output, inputs the nonce and the plaintext to be updated into the authenticated encryption and thereby generates a ciphertext and a tag used for updating, and updates a value of the tag stored in each of the nodes in the path with the tag used for the update.

Supplementary Note 10

A memory protection system comprises:

memory address allocation means for allocating, to each of nodes in a tree structure configured to protect a memory, a memory address unique to the node;

tag generation means for defining, for each of the nodes in the tree structure, a connection of the memory address and a constant as a nonce, generating, for each of leaf nodes and a specific node, a tag by inputting the nonce and a plaintext of which tampering with is to be detected, or the nonce and constants of a plurality of child nodes of each of the nodes into a message authentication code, and generating, for each of nodes other than the leaf nodes and the specific node, a tag by inputting the nonce, the nonce of the specific node, and the tag of the specific node into the message authentication code, the message authentication code being a code by which a partially-updatable tag can be output;

node generation means for generating each of the nodes in the tree structure by using the constant as a local counter and combining at least the tag and the local counter; and tag verification means for verifying whether or not a plaintext to be verified has been tampered with by generating a path from a leaf node containing the plaintext to a root node, defining, for each of nodes in the path, a connection of the memory address unique to the node and a local counter stored in the node as a nonce, and generating a tag used for a verification by inputting the nonce and the plaintext, or the nonce and the local counters of a plurality of child nodes of each of the nodes into a message authentication code, the message authentication code being a code by which a partially-updatable tag can be output.

Supplementary Note 11

The memory protection system described in Supplementary note 10, further comprising:

memory verification means for verifying whether or not a plaintext to be verified has been tampered with by generating a path from a leaf node containing the plaintext to a root node, defining, for each of nodes in the path, a connection of the memory address unique to the node and a local counter stored in the node as a nonce, and generating a tag used for a verification by inputting the nonce and the plaintext, or the nonce and the local counters of a plurality of child nodes of each of the nodes into a message authentication code, and then outputting a result of the verification and the path, the message authentication code being a code by which a partially-updatable tag can be output;

counter updating means for, when the result of the verification indicates that no tampering is detected, updating a value of the local counter in each of the nodes in the path; and tag generation means for, when the result of the verification indicates that no tampering is detected, defining a connection of the memory address unique to each of the nodes in the path and the local counter stored in each of the nodes as a nonce, generating a tag used for an update by inputting the nonce and the plaintext, or the nonce, the local counter of at least one child node of each of the nodes, the nonce before the update, and the local counter of at least one child node of each of the nodes before the update into the message authentication code, and updating a value of a tag stored in each of the nodes in the path with the tag used in the update, the message authentication code being the code by which the partially-updatable tag can be output.

Supplementary Note 12

A memory processing method comprising:
allocating, to each of nodes in a tree structure configured to protect a memory, a memory address unique to the node;
defining, for each of the nodes in the tree structure, a connection of the memory address and a constant as a nonce, generating, for each of leaf nodes and a specific node, a tag by inputting the nonce and a plaintext of which tampering with is to be detected, or the nonce and constants of a plurality of child nodes of each of the nodes into a message authentication code, and generating, for each of nodes other than the leaf nodes and the specific node, a tag by inputting the nonce, the nonce of the specific node, and the tag of the specific node into the message authentication code, the message authentication code being a code by which a partially-updatable tag can be output; and
generating each of the nodes in the tree structure by using the constant as a local counter and combining at least the tag and the local counter.

Supplementary Note 13

A memory verification method comprising:
inputting a tree structure configured to protect a memory and a memory address allocated to the tree structure; and
verifying whether or not a plaintext to be verified has been tampered with by generating a path from a leaf node containing the plaintext to a root node, defining, for each of nodes in the path, a connection of the memory address unique to the node and a local counter stored in the node as a nonce, and generating a tag used for a verification by inputting the nonce and the plaintext, or the nonce and the local counters of a plurality of child nodes of each of the nodes into a message authentication code, the message authentication code being a code by which a partially-updatable tag can be output.

Supplementary Note 14

A memory updating method comprising:
inputting a tree structure configured to protect a memory and a memory address allocated to the tree structure;
verifying whether or not a plaintext to be verified has been tampered with by generating a path from a leaf node containing the plaintext to a root node, defining, for each of nodes in the path, a connection of the memory address unique to the node and a local counter stored in the node as a nonce, and generating a tag used for a verification by inputting the nonce and the plaintext, or the nonce and the local counters of a plurality of child nodes of each of the nodes into a message authentication code, and then outputting a result of the verification and the path, the message authentication code being a code by which a partially-updatable tag can be output;
when the result of the verification indicates that no tampering is detected, updating a value of the local counter in each of the nodes in the path; and
when the result of the verification indicates that no tampering is detected, defining a connection of the memory address unique to each of the nodes in the path and the local counter stored in each of the nodes as a nonce, generating a tag used for an update by inputting the nonce and the plaintext, or the nonce, the local counter of at least one child node of each of the nodes, the nonce before the update, and the local counter of at least one child node of each of the nodes before the update into the message authentication code, and updating a value of a tag stored in each of the nodes in the path with the tag used in the update, the message authentication code being the code by which the partially-updatable tag can be output.

Supplementary Note 15

A non-transitory computer readable medium storing a program for causing a computer to perform:
a step of allocating, to each of nodes in a tree structure configured to protect a memory, a memory address unique to the node;
a step of defining, for each of the nodes in the tree structure, a connection of the memory address and a constant as a nonce, generating, for each of leaf nodes and a specific node, a tag by inputting the nonce and a plaintext of which tampering with is to be detected, or the nonce and constants of a plurality of child nodes of each of the nodes into a message authentication code, and generating, for each of nodes other than the leaf nodes and the specific node, a tag by inputting the nonce, the nonce of the specific node, and the tag of the specific node into the message authentication code, the message authentication code being a code by which a partially-updatable tag can be output; and
a step of generating each of the nodes in the tree structure by using the constant as a local counter and combining at least the tag and the local counter.

Supplementary Note 16

A non-transitory computer readable medium storing a program for causing a computer to perform:
a step of inputting a tree structure configured to protect a memory and a memory address allocated to the tree structure; and
a step of verifying whether or not a plaintext to be verified has been tampered with by generating a path from a leaf node containing the plaintext to a root node, defining, for each of nodes in the path, a connection of the memory address unique to the node and a local counter stored in the node as a nonce, and generating a tag used for a verification by inputting the nonce and the plaintext, or the nonce and the local counters of a plurality of child nodes of each of the nodes into a message authentication code, the message authentication code being a code by which a partially-updatable tag can be output.

Supplementary Note 17

A non-transitory computer readable medium storing a program for causing a computer to perform:
a step of inputting a tree structure configured to protect a memory and a memory address allocated to the tree structure;
a step of verifying whether or not a plaintext to be verified has been tampered with by generating a path from a leaf node containing the plaintext to a root node, defining, for each of nodes in the path, a connection of the memory address unique to the node and a local counter stored in the node as a nonce, and generating a tag used for a verification by inputting the nonce and the plaintext, or the nonce and the local counters of a plurality of child nodes of each of the nodes into a message authentication code, and then outputting a result of the verification and the path, the message authentication code being a code by which a partially-updatable tag can be output;

a step of, when the result of the verification indicates that no tampering is detected, updating a value of the local counter in each of the nodes in the path; and a step of, when the result of the verification indicates that no tampering is detected, defining a connection of the memory address unique to each of the nodes in the path and the local counter stored in each of the nodes as a nonce, generating a tag used for an update by inputting the nonce and the plaintext, or the nonce, the local counter of at least one child node of each of the nodes, the nonce before the update, and the local counter of at least one child node of each of the nodes before the update into the message authentication code, and updating a value of a tag stored in each of the nodes in the path with the tag used in the update, the message authentication code being the code by which the partially-updatable tag can be output.

REFERENCE SIGNS LIST

1 MEMORY PROTECTION SYSTEM
10 MEMORY STRUCTURE INITIALIZATION APPARATUS
20 MEMORY VERIFICATION APPARATUS
30 MEMORY UPDATING APPARATUS
100 PLAINTEXT INPUT UNIT
101 MEMORY ADDRESS ALLOCATION UNIT
102 PARTIALLY UPDATABLE TAG GENERATION UNIT
103 LEAF NODE GENERATION UNIT
104 INTERMEDIATE NODE GENERATION UNIT
105 ROOT NODE GENERATION UNIT
106 TREE STRUCTURE OUTPUT UNIT
107 MEMORY ADDRESS OUTPUT UNIT
200 TREE STRUCTURE INPUT UNIT
201 MEMORY ADDRESS INPUT UNIT
202 VALIDATION PART INPUT UNIT
203 TAG VERIFICATION UNIT
204 VERIFICATION RESULT OUTPUT UNIT
300 TREE STRUCTURE INPUT UNIT
301 MEMORY ADDRESS INPUT UNIT
302 UPDATE PART INPUT UNIT
303 MEMORY VERIFICATION UNIT
304 COUNTER UPDATING UNIT
305 PARTIALLY UPDATABLE TAG UPDATING UNIT
306 UPDATE RESULT OUTPUT UNIT
11 MEMORY PROCESSING APPARATUS
12 MEMORY ADDRESS ALLOCATION UNIT
13 TAG GENERATION UNIT
14 NODE GENERATION UNIT

What is claimed is:

1. A memory processing apparatus comprising:
hardware, including a processor and memory;
memory address allocation unit implemented at least by the hardware and configured to allocate, to each of nodes in a tree structure configured to protect a memory, a memory address unique to the node;

tag generation unit implemented at least by the hardware and configured to (A) define, for each of the nodes in the tree structure, a connection of a value of the memory address unique to each of the nodes and a constant, as a nonce, (B) generate, for each of leaf nodes and a specific node, a tag by inputting the nonce of each of the nodes and a plaintext of which tampering with is to be detected into a message authentication code, or by inputting the nonce of each of the nodes and constants of a plurality of child nodes of each of the nodes into the message authentication code, and (C) generate, for each of nodes other than the leaf nodes and the specific node, a tag by inputting the nonce of each of the nodes, the nonce of the specific node, and the tag of the specific node into the message authentication code, the message authentication code being a code by which a partially-updatable tag can be output; and node generation unit implemented at least by the hardware and configured to generate each of the nodes in the tree structure by using the constant as a local counter and combining at least the tag and the local counter.

2. The memory processing apparatus according to claim 1, wherein the node generation unit comprises:
leaf node generation unit implemented at least by the hardware and configured to generate a leaf node in the tree structure by combining the plaintext, the tag, and the local counter;
intermediate node generation unit implemented at least by the hardware and configured to generate an intermediate node in the tree structure by combining the tag and the local counter; and
root node generation unit implemented at least by the hardware and configured to generate a root node in the tree structure by combining the tag and the local counter.

3. The memory processing apparatus according to claim 2, wherein
the tag generation unit generates a ciphertext to be verified and the tag by inputting the nonce and the constants of the plurality of child nodes into the message authentication code, and inputting the nonce and the plaintext into an authenticated encryption, and
the leaf node generation unit generates the leaf node by combining the ciphertext, the tag, and the local counter.

4. The memory processing apparatus according to claim 3, wherein
the message authentication code is a message authentication code by which (A) each of plaintext blocks constituting a plaintext to be verified is encrypted by an encryption method in which, for an input of a block cipher, an exclusive OR of masks each of which is derived from a nonce, a private key, and a constant which varies for each of the blocks, is obtained, and (B) an authentication tag is generated by obtaining an exclusive OR of results of the encryption of the plaintext blocks, and
the authenticated encryption is authenticated encryption (A) by which a ciphertext is generated by encrypting each of plaintext blocks constituting a plaintext to be encrypted by an encryption method in which, for an input and an output of block cipher, an exclusive OR of masks, each of which is derived from the nonce, the private key, and the constant which varies for each of the blocks, is obtained, and (B) by which an authentication tag is generated by calculating a checksum of the plaintext by using the plaintext blocks, and encrypting the checksum by an encryption method in which, for the input and the output of the block cipher, an exclusive OR of masks, each of which is derived from the nonce, the private key, and the constant which varies for each of the blocks, is obtained.

5. The memory processing apparatus according to claim 3, wherein
the message authentication code is a message authentication code by which (A) each of plaintext blocks constituting a plaintext to be verified is encrypted by an encryption method in which a constant, which varies for each of the blocks, is input to a Tweak part of Tweakable block cipher, and is encrypted by an encryption method in which a nonce is input to the Tweak part of the Tweakable block cipher, and (B) an authentication tag is generated by obtaining an exclusive OR of results of the encryption of the plaintext blocks and a result of the encryption of the nonce, and
the authenticated encryption is authenticated encryption (A) by which a ciphertext is generated by encrypting each of plaintext blocks constituting a plaintext to be encrypted by an encryption method in which a nonce and a constant, which varies for each of the blocks, are input to the Tweak part of the Tweakable block cipher, and (B) by which an authentication tag is generated by calculating a checksum of the plaintext by using the plaintext blocks, and encrypting the checksum by an encryption method in which the nonce and the constant, which varies for each of the blocks, are input to the Tweak part of the Tweakable block cipher.

6. A memory verification apparatus comprising:
hardware, including a processor and memory;
input unit implemented at least by the hardware and configured to input a tree structure configured to protect a memory and a memory address allocated to the tree structure; and
tag verification unit implemented at least by the hardware and configured to verify whether or not a plaintext to be verified has been tampered with by (A) generating a path from a leaf node containing the plaintext to a root node, (B) defining, for each of nodes in the path, a connection of a value of the memory address unique to each of the nodes and a local counter stored in each of the nodes, as a nonce, and (C) generating a tag used for a verification by inputting the nonce of each of the nodes and the plaintext into a message authentication code, or by inputting the nonce of each of the nodes and the local counters of a plurality of child nodes of each of the nodes into a message authentication code, the message authentication code being a code by which a partially-updatable tag can be output.

7. The memory verification apparatus according to claim 6, wherein the tag verification unit verifies whether or not a ciphertext to be verified has been tampered with by (A) generating, in the tree structure, a path from a leaf node containing the ciphertext to the root node, (B) defining, for each of nodes in the path, a connection of a value of a memory address unique to each of the nodes and a local counter stored in the node, as a nonce, (C) inputting the nonce of each of the nodes and local counters of a plurality of child nodes of each of the nodes into the message authentication code, and thereby (D) generating a tag used for a verification, and (E) inputting the nonce, the ciphertext, and the tag used for the verification into the authenticated encryption, and thereby (F) verifying whether or not the plaintext has been tampered with.

8. A memory updating apparatus comprising:
hardware, including a processor and memory;
input unit implemented at least by the hardware and configured to input a tree structure configured to protect a memory and a memory address allocated to the tree structure;
memory verification unit implemented at least by the hardware and configured to verify whether or not a plaintext to be verified has been tampered with by (A) generating a path from a leaf node containing the plaintext to a root node, (B) defining, for each of nodes in the path, a connection of a value of the memory address unique to each of the nodes and a local counter stored in each of the nodes, as a nonce, and (C) generating a tag used for a verification by inputting the nonce of each of the nodes and the plaintext into a message authentication code, or by inputting the nonce of each of the nodes and the local counters of a plurality of child nodes of each of the nodes into a message authentication code, and then output a result of the verification and the path, the message authentication code being a code by which a partially-updatable tag can be output;
counter updating unit implemented at least by the hardware and configured to, when the result of the verification indicates that no tampering is detected, update a value of the local counter in each of the nodes in the path; and
tag generation unit implemented at least by the hardware and configured to, when the result of the verification indicates that no tampering is detected, (A) define a connection of a value of the memory address unique to each of the nodes in the path and the local counter stored in each of the nodes, as a nonce, (B) generate a tag used for an update by inputting the nonce of each of the nodes and the plaintext into the message authentication code, or by inputting the nonce of each of the nodes, the local counter of at least one child node of each of the nodes, the nonce each of the nodes before the update, and the local counter of at least one child node of each of the nodes before the update into the message authentication code, and (C) update a value of a tag stored in each of the nodes in the path with the tag used in the update.

9. The memory updating apparatus according to claim 8, wherein
the memory verification unit (A) verifies whether or not a ciphertext to be updated has been tampered with by (a) generating, in the tree structure, a path from a leaf node containing the ciphertext to the root node, (b) defining, for each of nodes in the path, a connection of a value of a memory address unique to each of the nodes and a local counter stored in each of the nodes, as a nonce, (c) inputting the nonce each of the nodes and local counters of a plurality of child nodes of each of the nodes into the message authentication code, and thereby (d) generating a tag used for a verification, and (e) inputting the nonce of each of the nodes, the ciphertext, and the tag used for the verification into the authenticated encryption, and thereby (f) verifying whether or not the plaintext has been tampered with, and thereby (B) outputs a result of the verification and the path, and
when the result of the verification indicates that no tampering has been detected, the tag updating unit (A) defines a connection of a value of the memory address unique to each of the nodes and a local counter stored in each of the nodes, as a nonce, (B) inputs the nonce of each of the nodes, the local counter of at least one child node of each of the nodes, the nonce of each of the nodes before the update, and the local counter of at least one child node of each of the nodes before the update into the message authentication code, (C) inputs the nonce of each of the nodes and the plaintext to be updated into the authenticated encryption and thereby (D) generates a ciphertext and a tag used for updating, and (E) updates a value of the tag stored in each of the nodes in the path with the tag used for the update.

10. A memory processing method performed by a computer and comprising:
    allocating, to each of nodes in a tree structure configured to protect a memory, a memory address unique to the node;
    (A) defining, for each of the nodes in the tree structure, a connection of a value of the memory address unique to each of the nodes and a constant, as a nonce, (B) generating, for each of leaf nodes and a specific node, a tag by inputting the nonce of each of the nodes and a plaintext of which tampering with is to be detected into a message authentication code, or by inputting the nonce of each of the nodes and constants of a plurality of child nodes of each of the nodes into the message authentication code, and (C) generating, for each of nodes other than the leaf nodes and the specific node, a tag by inputting the nonce of each of the nodes, the nonce of the specific node, and the tag of the specific node into the message authentication code, the message authentication code being a code by which a partially-updatable tag can be output; and
    generating each of the nodes in the tree structure by using the constant as a local counter and combining at least the tag and the local counter.

11. A non-transitory computer readable medium storing a program executable by a computer to perform a method comprising:
    allocating, to each of nodes in a tree structure configured to protect a memory, a memory address unique to the node;
    (A) defining, for each of the nodes in the tree structure, a connection of a value of the memory address unique to each of the nodes and a constant, as a nonce, (B) generating, for each of leaf nodes and a specific node, a tag by inputting the nonce of each of the nodes and a plaintext of which tampering with is to be detected into a message authentication code, or by inputting the nonce of each of the nodes and constants of a plurality of child nodes of each of the nodes into the message authentication code, and (C) generating, for each of nodes other than the leaf nodes and the specific node, a tag by inputting the nonce of each of the nodes, the nonce of the specific node, and the tag of the specific node into the message authentication code, the message authentication code being a code by which a partially-updatable tag can be output; and
    generating each of the nodes in the tree structure by using the constant as a local counter and combining at least the tag and the local counter.

* * * * *